US005988026A

United States Patent [19]

Reckelhoff et al.

[11] Patent Number: 5,988,026

[45] Date of Patent: Nov. 23, 1999

[54] SCREW FEED AND DRIVER FOR A SCREW DRIVING TOOL

[75] Inventors: Jerome E. Reckelhoff; Donald J. Massari, Jr., both of Cincinnati, Ohio

[73] Assignee: Senco Products, Inc., Cincinnati, Ohio

[21] Appl. No.: 08/984,674

[22] Filed: Dec. 3, 1997

[51] Int. Cl.$^{6}$ .......................... B25B 23/04; B25B 13/22; B25B 13/02; F16D 13/04

[52] U.S. Cl. ............................ 81/434; 227/136; 227/138; 227/119; 192/34

[58] Field of Search .................................. 81/57.37, 434; 173/11, 4; 227/138, 136, 135, 119; 192/69.82, 54.5, 93 A, 34

[56] References Cited

U.S. PATENT DOCUMENTS

| | | | |
|---|---|---|---|
| 4,014,488 | 3/1977 | Potucek et al. | 226/6 |
| 4,404,877 | 9/1983 | Mizuno et al. . | |
| 4,774,863 | 10/1988 | Geist | 81/434 |
| 5,083,483 | 1/1992 | Takagi | 81/434 |
| 5,109,738 | 5/1992 | Farian et al. | 81/434 |
| 5,167,174 | 12/1992 | Fujiyama et al. | 81/434 |
| 5,337,636 | 8/1994 | Shea . | |
| 5,473,965 | 12/1995 | Chen . | |
| 5,687,624 | 11/1997 | Tsuge et al. | 81/434 |

FOREIGN PATENT DOCUMENTS

| | | |
|---|---|---|
| 27254/77 | 1/1979 | Australia . |
| 058986 | 9/1982 | European Pat. Off. . |
| 623426 | 11/1994 | European Pat. Off. . |
| 4119925 | 1/1992 | Germany . |
| 4208715 | 9/1992 | Germany . |
| 19526543 | 1/1996 | Germany . |

*Primary Examiner*—David A. Scherbel
*Assistant Examiner*—Philip J. Hoffmann
*Attorney, Agent, or Firm*—Jerrold J. Litzinger

[57] ABSTRACT

A screw feed and driver assembly which may constitute a part of a screw driving tool of the type having a prime mover, a speed and torque determining gear assembly and a clutch; which can constitute an accessory for a clutch containing manual feed power screw driver; and which, combined with a clutch, can comprise an accessory for a standard manual power drill. The screw feed and driver assembly comprises a feed housing with a slide body mounted therein and shiftable between forward and rearward positions. The slide body is biased to its forward position. The slide body receives a strip bearing screws. A contact foot is mounted on the slide body and shifts the slide body rearwardly when pressed against a workpiece. A screw driver, affixed to the clutch, extends into the slide body. The slide body contains a pawl and feed sprocket assembly. The sprocket engages notches in one edge of the screw bearing strip. When the slide body is shifted rearwardly by the contact foot, the pawl rotates the sprocket a predetermined amount to advance the forwardmost screw of the strip to a driving position. Further rearward movement of the slide body engages a driver with the forwardmost screw and thereafter actuates the clutch to drive the forwardmost screw. The mounting of the contact foot on the slide body can be adjusted to accommodate different length screws. An adjustable stop block determines the rearwardmost position of the slide body and the depth to which the screws are driven. An improved clutch mechanism substantially eliminates clutch chatter.

36 Claims, 28 Drawing Sheets

SCREW FEED AND DRIVER FOR A SCREW DRIVING TOOL

TECHNICAL FIELD

The invention relates to a screw feed and driver assembly, and more particularly to such an assembly which may constitute a part of a power screw driver; which may constitute an accessory for an existing non-self feed screw driver; and which, in combination with a clutch mechanism, may constitute an accessory for a standard power drill.

BACKGROUND ART

Prior art workers have devised many types of powered screwdrivers. These powered screwdrivers generally fall into three basic categories. The first is an accessory for a standard drill. The drill or the accessory may or may not include a clutch. A screw is manually held during the initial part of the screw driving operation. A second category of powered screwdrivers constitutes a dedicated power screwdriver tool containing a prime mover, a gear assembly to determine speed and torque, a clutch and a chuck to support a driver. Again, the screw is manually placed for driving. A third category comprises a self-feeding powered screwdriver. Commonly, such a screwdriver uses an elongated strip carrying a plurality of screws.

The present invention relates to a screw feed and driver assembly which, as will be apparent hereinafter, can be associated with a powered screwdriver of any of the three categories listed above. Heretofore, self-feeding screw driving tools have been prone to jamming, mis-feeds, and malfunctions. Generally, they are bulky and awkward to use. Frequently, they are difficult to adjust for different screw lengths.

The present invention is directed to a structure which eliminates these problems, provides easy adjustment for different screw lengths; and additionally provides for easy depth of drive adjustment.

DISCLOSURE OF THE INVENTION

According to the invention there is provided a screw feed and driver assembly which can constitute a part of a screw driving tool of the type having a prime mover, a speed and torque determining gear assembly and a clutch; which can constitute an accessory for a clutch containing manual feed power screw driver; and which, combined with a clutch, can comprise an accessory for a standard powered drill.

The screw feed and driver assembly comprises an elongated housing. A slide body is mounted within the housing and is shiftable therein between a forward position and a rearward position. The slide body is biased to its forward position by a compression spring.

The slide body receives an elongated strip on which a plurality of screws are mounted. A contact foot is affixed to the slide body and shifts the slide body rearwardly when pressed against a workpiece. A screwdriver extends into the slide body.

The slide body contains a pawl and a feed sprocket assembly. The sprocket engages notches in one edge of the screw-bearing strip, enabling the driver to be coaxial with a screw positioned to be driven. When the slide body is shifted rearwardly by the contact foot, the pawl rotates the sprocket a predetermined amount to advance the forwardmost screw of the strip to a driving position. Additional rearward movement of the slide body causes the driver to engage the forwardmost screw and thereafter activates the clutch to drive the driver and thus the forwardmost screw. When the contact foot is removed from the workpiece, the slide body will shift forwardly. This causes the pawl to return to its normal position. The sprocket is incapable of reverse rotation or freewheeling.

The mounting of the contact foot on the slide body is adjustable longitudinally in order to accommodate nails of different lengths. The feed housing contains a manually adjustable stop block determining the rearwardmost position of the slide body and the depth to which the screws are driven. The invention also provides an improved clutch mechanism which substantially eliminates clutch chatter.

DETAILED DESCRIPTION OF THE INVENTION

It will be understood that the screwdriving tool of the present invention can be powered by any appropriate prime mover such as a pneumatic motor, an electric motor connected to a source of electrical power or a battery powered electric motor. For purposes of an exemplary showing, the tool will be described in its embodiment as a battery powered, electric motor driven screwdriving tool.

Figure 1:
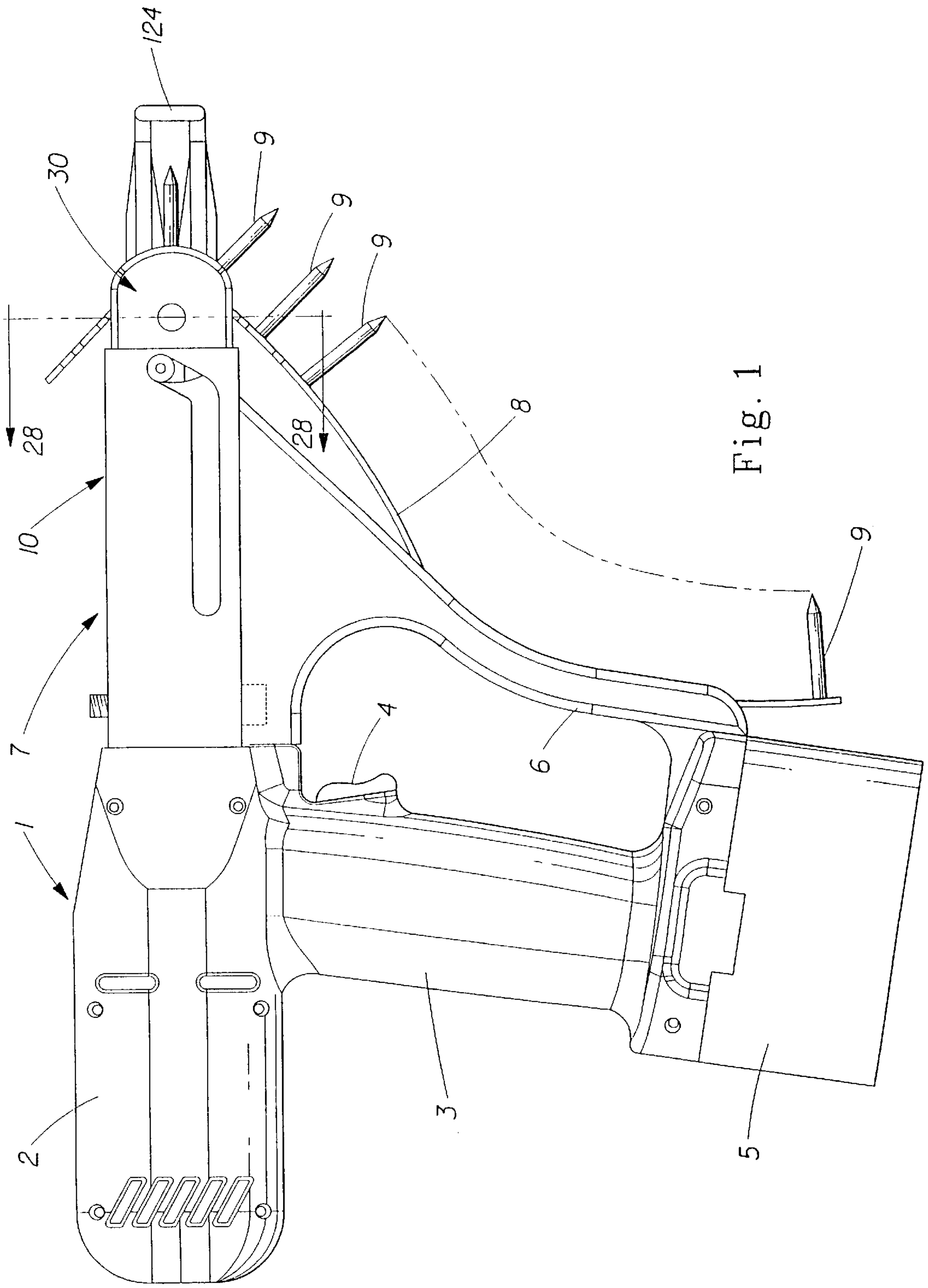
FIG. 1 is a right side elevational view of the self-feeding screwdriver tool of the present invention.
Figure 2:
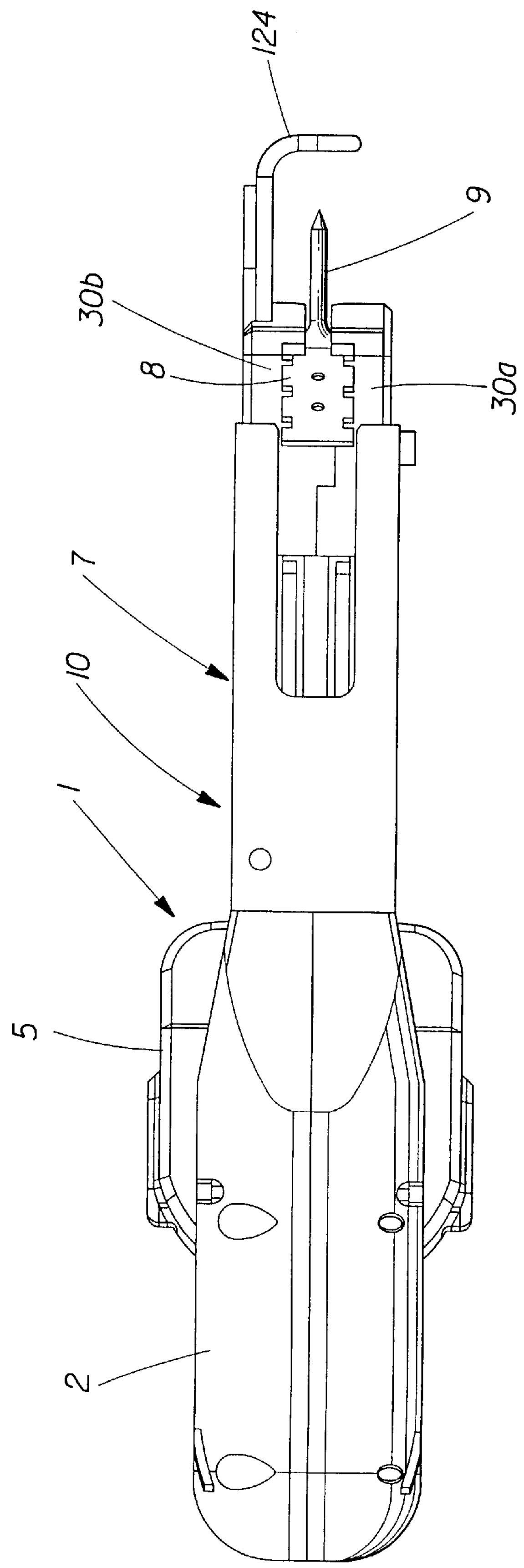
FIG. 2 is a top view of the tool of FIG. 1.

Throughout the drawings, like parts have been given like index numerals. Reference is first made to FIGS. 1 and 2. These Figures show the tool in its entirety. FIG. 1 is a right side elevation and FIG. 2 is a top view. The tool is generally indicated at 1 and is made up of a number of basic parts. These parts include a main housing portion 2, a handle portion 3 supporting a tool-actuating trigger 4, a battery casing 5, a trigger guard and screw strip guide 6, and a screw feed and driver assembly, generally indicated at 7.

The main body portion 2 contains an electric motor, a motor mount, an in-line planetary drive which determines the speed of rotation and the torque of the tool, a clutch, and appropriate bearings, as is known in the art. All of these parts may be conventional. It is a feature of the present invention, however, to provide an improved clutch, as will be set forth hereinafter. The handle portion 3 and trigger 4 are conventional, and so is the battery casing 5. As is also known in the art, a portion of the front edge of the trigger guard and screw strip guide 6 may be provided with a T-shaped channel (not shown) through which the screw strip 8 passes, bearing its screws 9. Such channels are known in the art and the purpose of the channel is to properly guide and control the incoming portion of the screw strip 8 for receipt by the screw feed and driver assembly 7.

The primary feature of the present invention is the screw feed and driver assembly 7, now to be described.

Throughout the specification and claims, such terms as "front", "rear", "top", "bottom", "right side", "left side", and the like, are used with respect to various parts of the tool as they would appear to a tool operator holding the tool in a horizontal oriented, forwardly directed manner. This language use is primarily for purposes of clarity of description and for use with the drawings. It is fully understood that, in use, the screwdriving tool of the present invention may assume any orientation.

Figure 3:
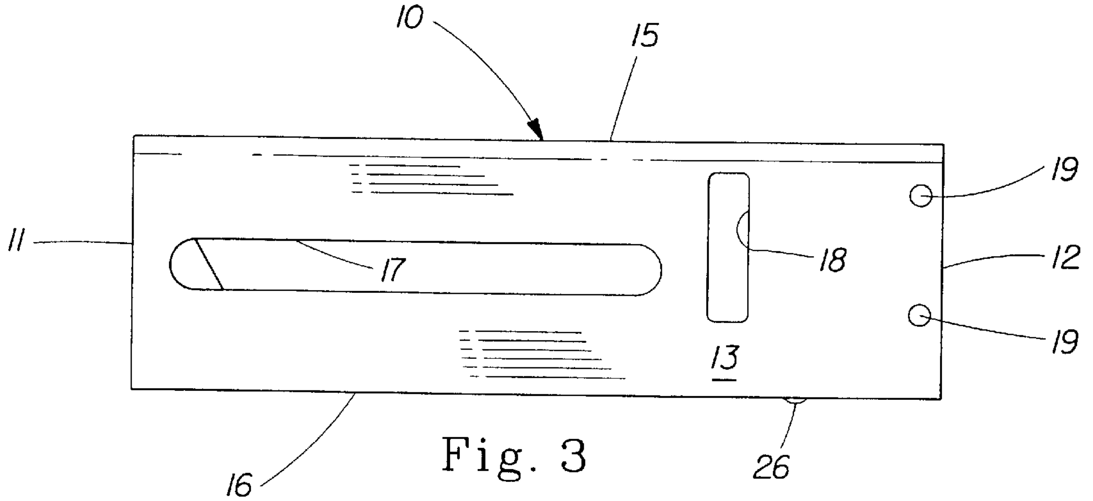
FIG. 3 is a left side elevational view of the feed housing of the present invention.
Figure 4:
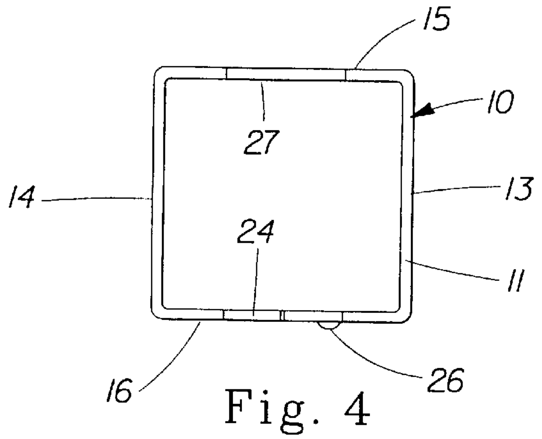
FIG. 4 is a front elevational view of the feed housing.
Figure 5:
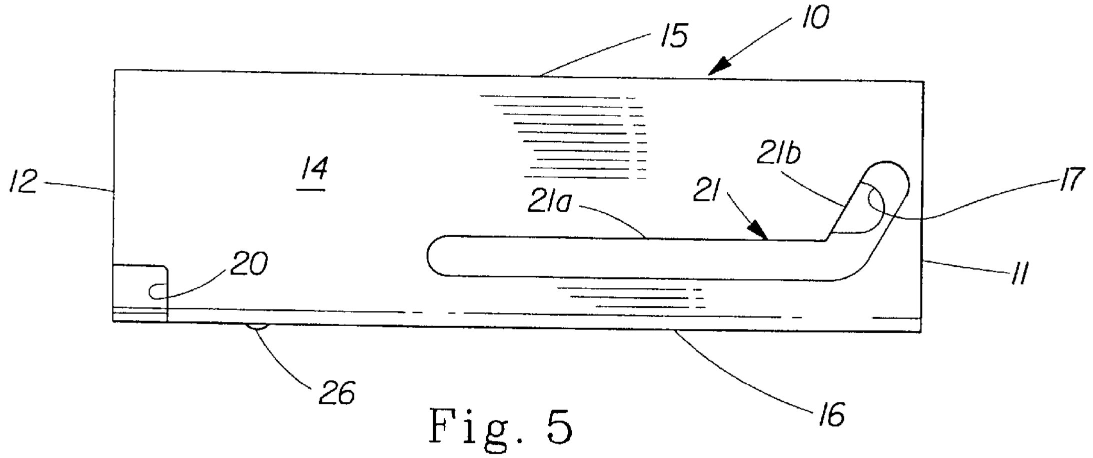
FIG. 5 is a right side elevational view of the feed housing.

The feed housing is generally indicated at 10 and comprises an elongated hollow rectangular housing having a forward end 11, a rearward end 12, a left side 13, a right side 14, a top 15 and a bottom 16. FIG. 3 illustrates the left side 13 of feed housing 10. The left side is provided with an elongated longitudinal slot 17, a transverse or vertical slot 18 and a pair of holes 19. The purpose of the slots 17 and 18 and the holes 19 will be apparent hereinafter. FIG. 4 is a front elevational view of feed housing 10. The right side 14 of feed housing 10 is illustrated in FIG. 5. The right side 14 is provided with a notch 20 and an elongated slot generally indicated at 21. The slot 21 is made up of a longitudinal portion 21*a* and an upwardly and forwardly directed portion 21*b*. The purpose of notch 20 and slot 21 will be apparent hereinafter.

Figure 6:
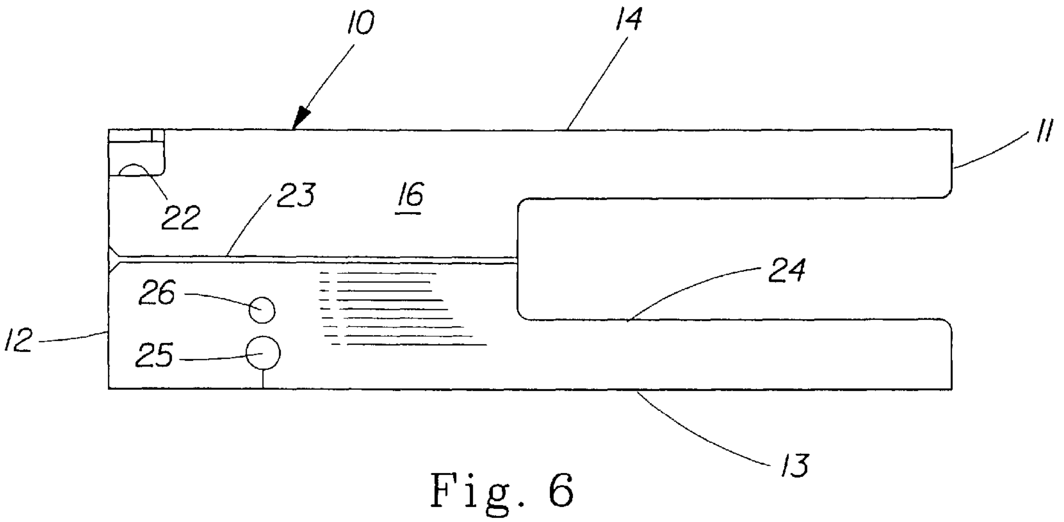
FIG. 6 is a bottom view of the feed housing.

FIG. 6 illustrates the bottom 16 of feed housing 10. The bottom is provided with a small notch 22 constituting a continuation of the notch 20 in the feed housing right side 14. The bottom 16 may have a weld seam 23 therein if the feed housing 10 is made from a single piece of sheet metal. The housing 10 could also be made of tube stock having a substantially square cross-section. The bottom 16 is provided with a large slot 24 to accommodate the incoming screw strip 8. The bottom 16 is completed by the provision of an unthreaded perforation 25 and an adjacent detent 26, the purposes of which will be apparent hereinafter.

Figure 7:
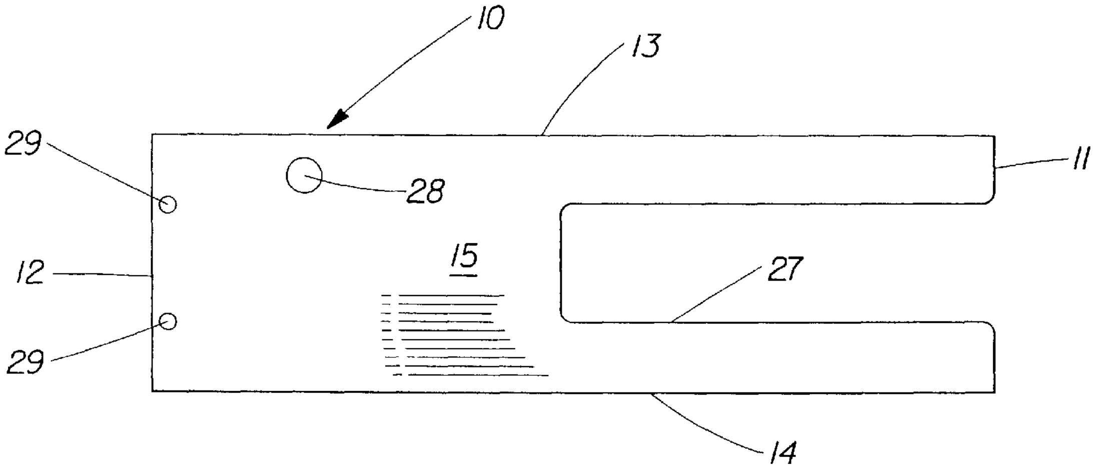
FIG. 7 is a top view of the feed housing.

Finally, the top 15 of feed housing 10 is shown in FIG. 7. The top is provided with an elongated longitudinal slot 27, identical to bottom slot 24, and serving to provide clearance for the outgoing screw strip 8. The top 15 also has an unthreaded perforation 28 coaxial with the unthreaded perforation 25 of bottom 16. Top 15 is completed by the provision of a pair of holes 29, similar to the holes 19 of left side 13 (see FIG. 3). The purpose of holes 28 and 29 will be apparent hereinafter.

The hollow feed housing 10 is adapted to receive a slide body, slidably mounted therein. The slide body is generally indicated in FIG. 1 at 30. Slide body 30 is made up of a right half shown in FIGS. 8–13 at 30*a,* and a left half illustrated in FIGS. 14 through 18 at 30*b*.

Figure 8:
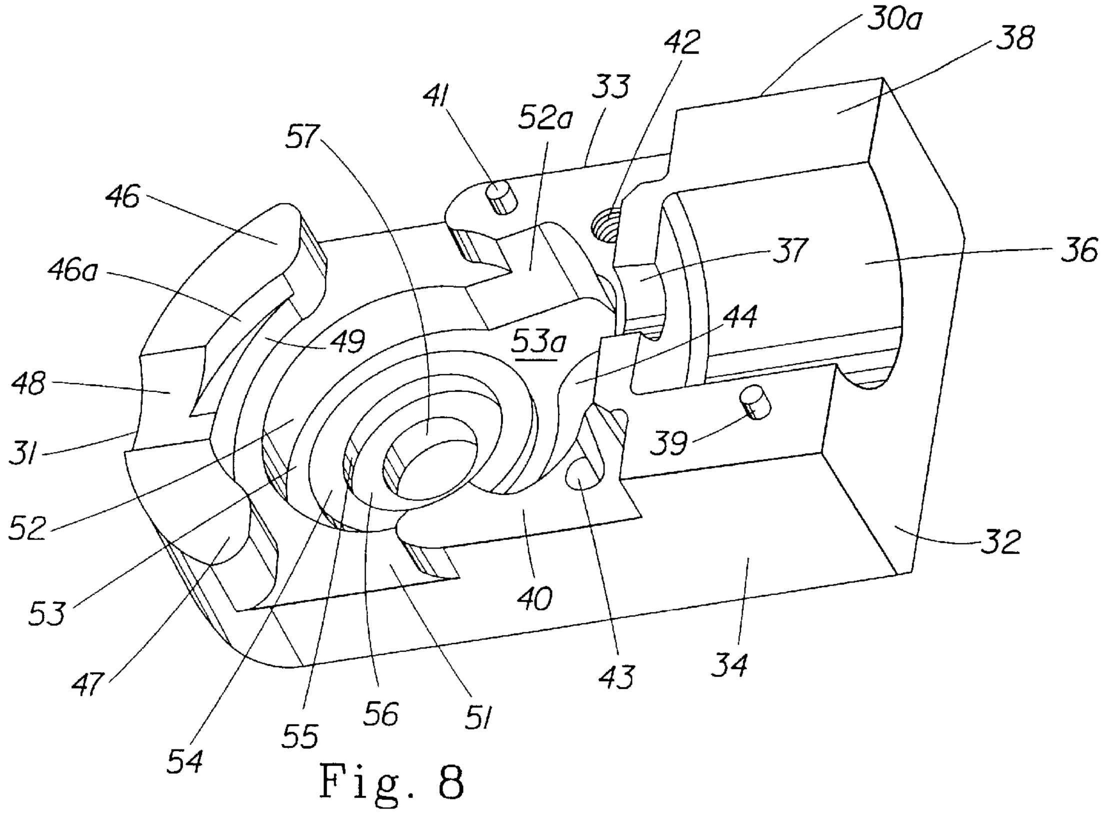
FIG. 8 is a perspective view of the right half of the slide body of the present invention.
Figure 9:
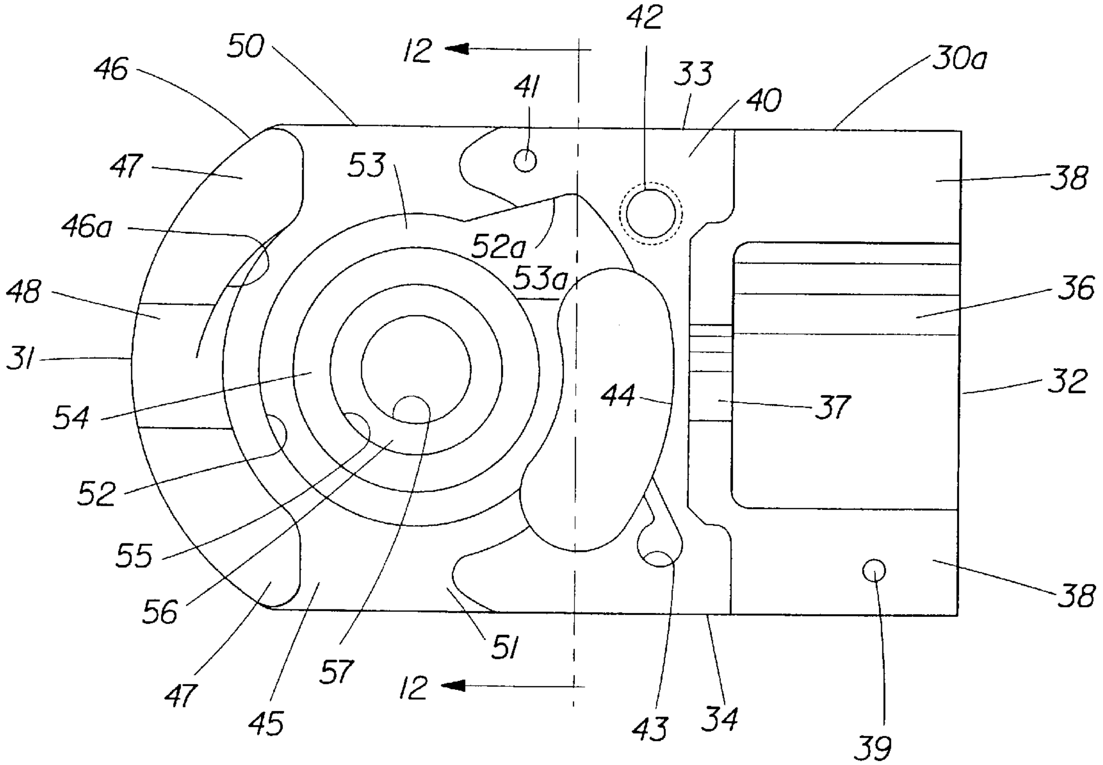
FIG. 9 is an inside elevational view of the slide body right half.
Figure 10:
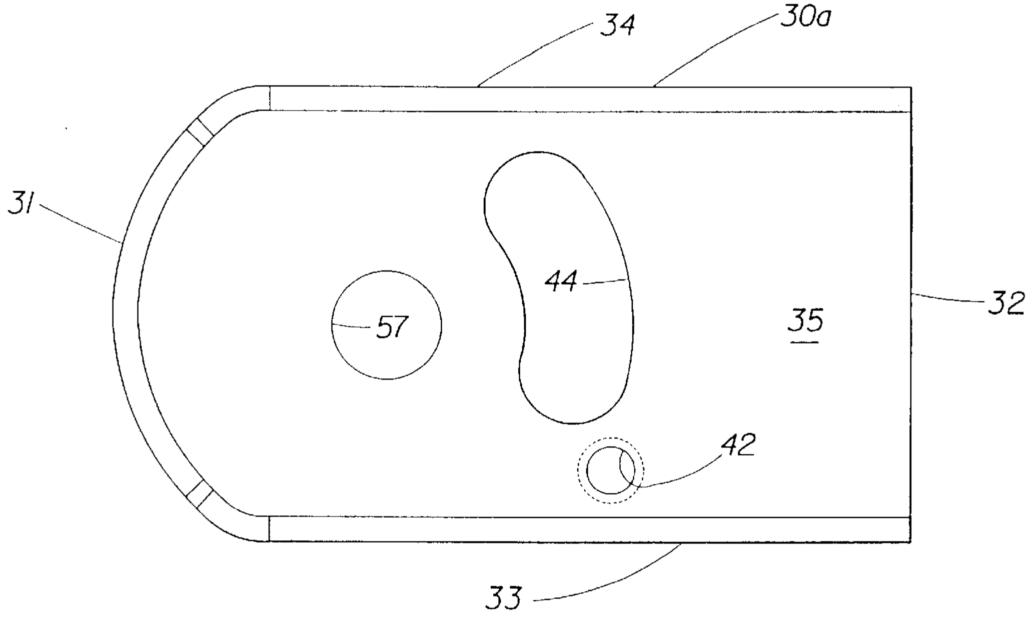
FIG. 10 is an outside elevational view of the slide body right half.
Figure 11:
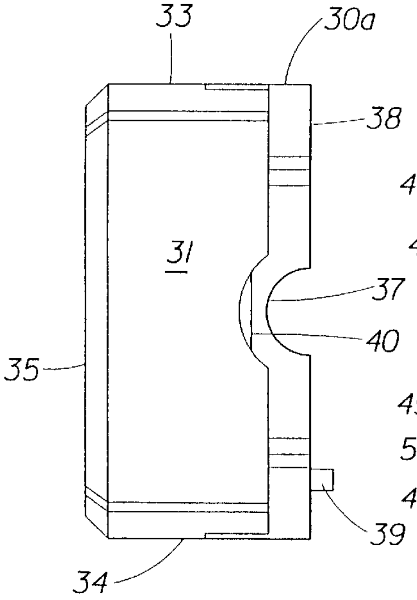
FIG. 11 is a front elevational view of the slide body right half.
Figure 12:
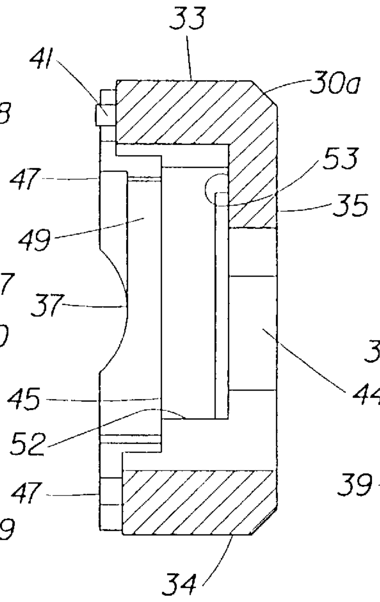
FIG. 12 is a cross-sectional view taken along section line 12—12 of FIG. 9.
Figure 13:
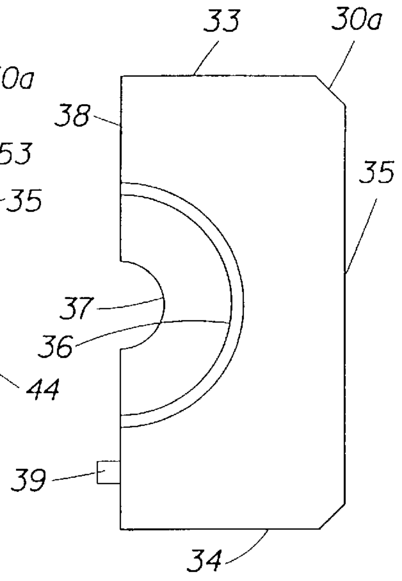
FIG. 13 is a rear end elevational view of the right slide body half.

Turning first to FIGS. 8–13, the right slide body half 30*a* has a forward end 31, a rearward end 32, top and bottom surfaces 33 and 34, a series of inside surfaces as shown in FIGS. 8 and 9, and a planar outside surface 35, as shown in FIG. 10.

Referring again to FIGS. 8 and 9, the rearward end of right slide body half 30*a* has a semi-cylindrical bore 36 which terminates in a smaller diameter semicylindrical bore 37. The bores 36 and 37 extend toward the outside surface 35 of the right slide body half 30*a* from a planar surface 38. The planar surface 38 also supports a locating pin 39. Planar surface 38 terminates in a planar surface 40 which is closer to outside surface 35 than is planar surface 38. Planar surface 40 contains another locating pin 41, a threaded bore 42, and a slot 43 having a circular end. Adjacent planar surface 40, there is an arcuate slot 44, having rounded ends, and extending through the exterior surface 35 (see FIG. 10).

Planar surface 40 is followed by another planar surface 45 which is even closer to outside surface 35 than is surface 40. The surface 45 terminates at a forward wall 46. The wall 46 has a planar top surface 47 interrupted by an arcuate notch 48. Wall 46 has a surface portion 46*a* (to be described hereinafter) and a portion 49, which cooperates with planar surface 45 to act as a guide for screw strip 8. It will be noted that right slide body half 30*a* defines a part of the entrance 50 and the exit 51 for screw strip 8.

Figure 28:
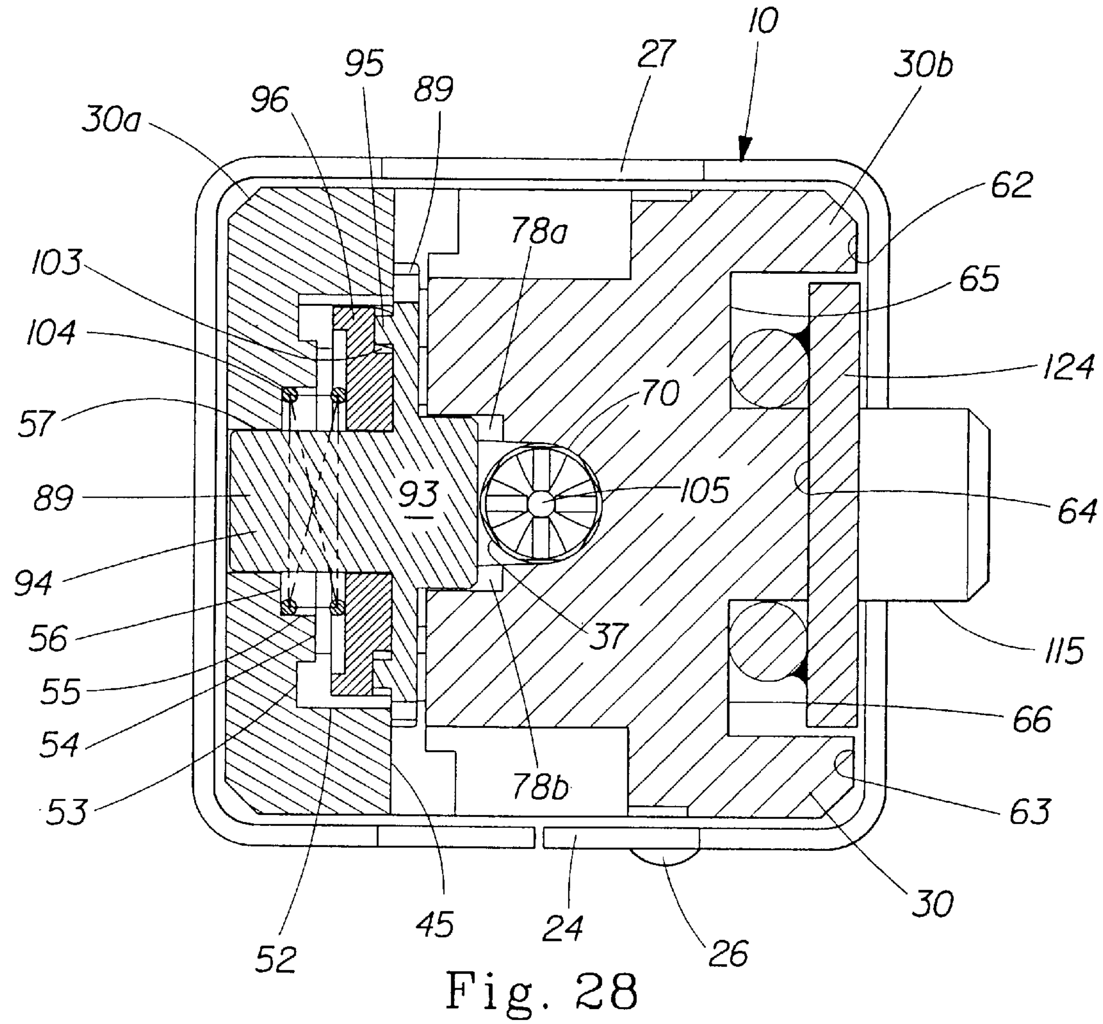
FIG. 28 is a cross-sectional view taken along section line 28—28 of FIG. 1, with the screw bearing tape removed.

Reference is now made to FIGS. 8, 9 and 28. The surface 45 of the right slide body half 30*a* has formed therein a bore 52 with an extension 52*a*. The bore 52 terminates in an annular surface 53 with an extension 53*a*. Adjacent surface 53 there is an upstanding annular rim 54. The rim 54 is followed by a bore 55, an annular shoulder 56 and a bore 57 which extends through the outer surface 35 of the right slide body half 30*a* (see FIG. 10). The purposes of bore 52, annular surface 53, annular rim 54, bore 55, annular shoulder 56 and bore 57 will be apparent hereinafter.

Figure 14:
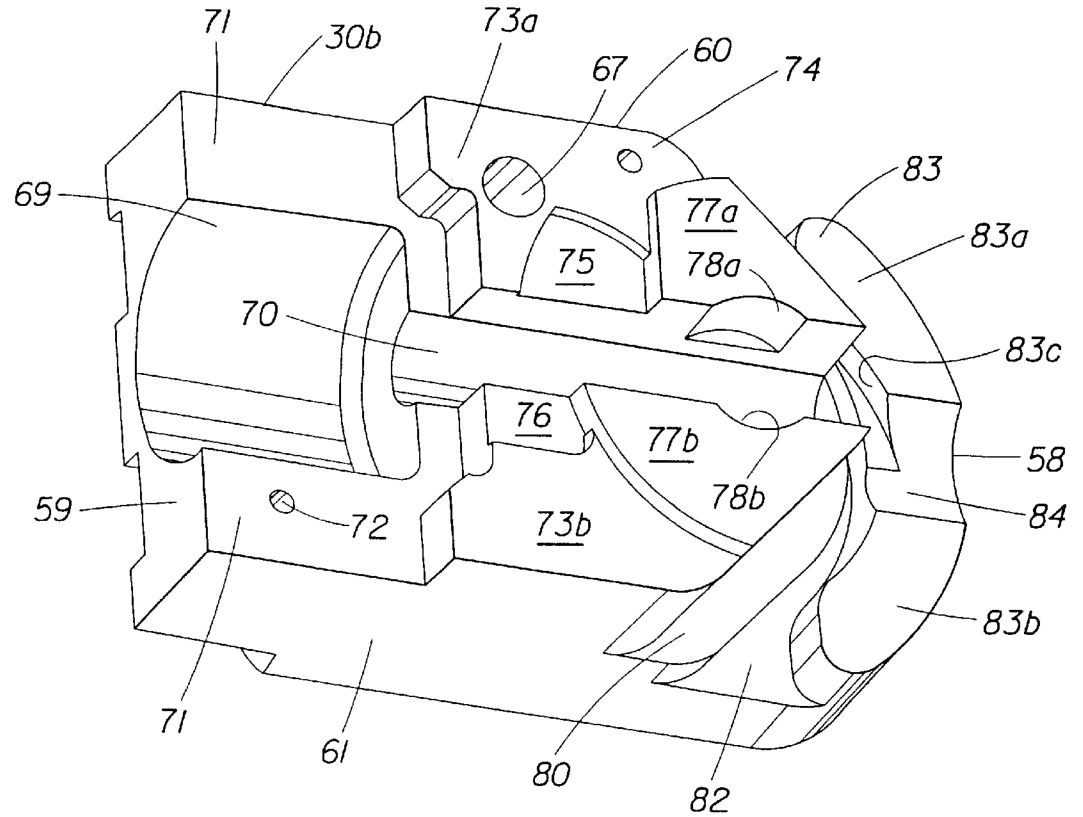
FIG. 14 is a perspective view of the left half of the slide body of the present invention.
Figure 15:
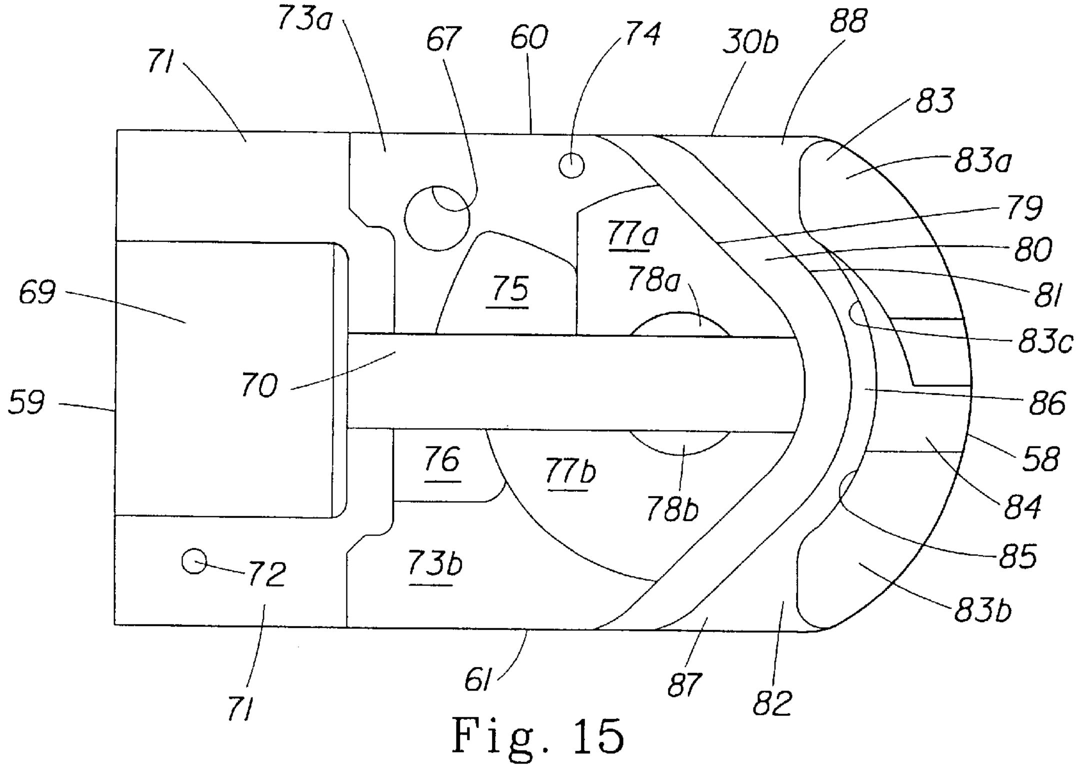
FIG. 15 is an inside elevational view of the slide body left half.
Figure 16:
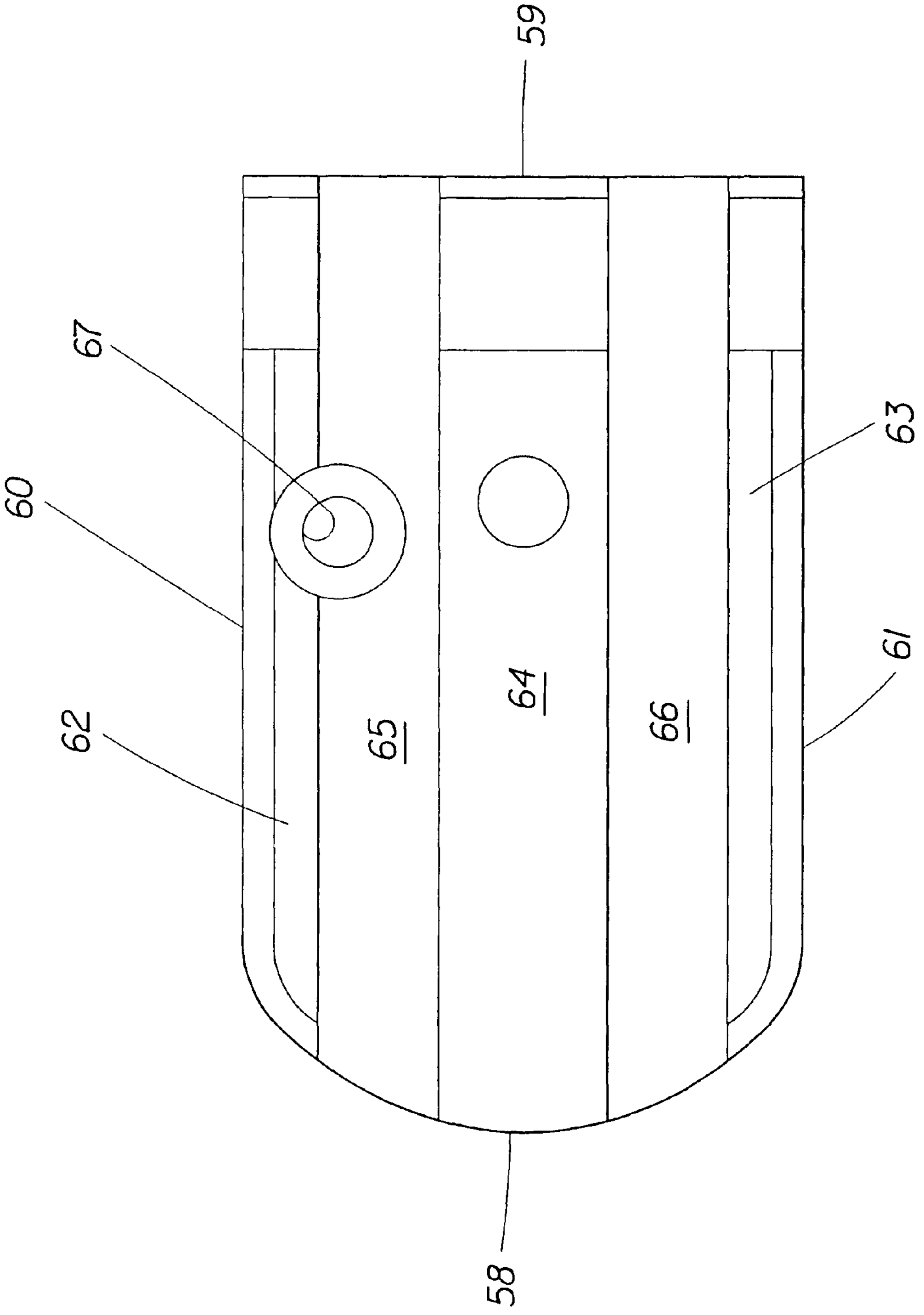
FIG. 16 is an outside elevational view of the slide body left half

Reference is now made to FIGS. 14–18, illustrating the left slide body half 30*b*. The body half 30*b* has a forward end 58, a rearward end 59, a top surface 60, a bottom surface 61, a plurality of internal surfaces as shown in FIGS. 14 and 15 and a plurality of external surfaces, as shown in FIG. 16.

Figure 17:
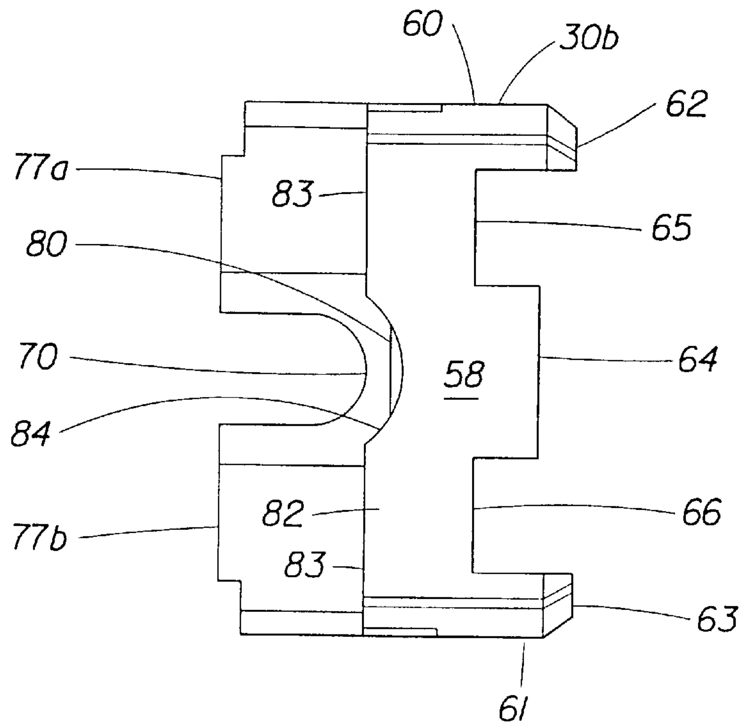
FIG. 17 is a front end elevational view of the slide body left half.
Figure 18:
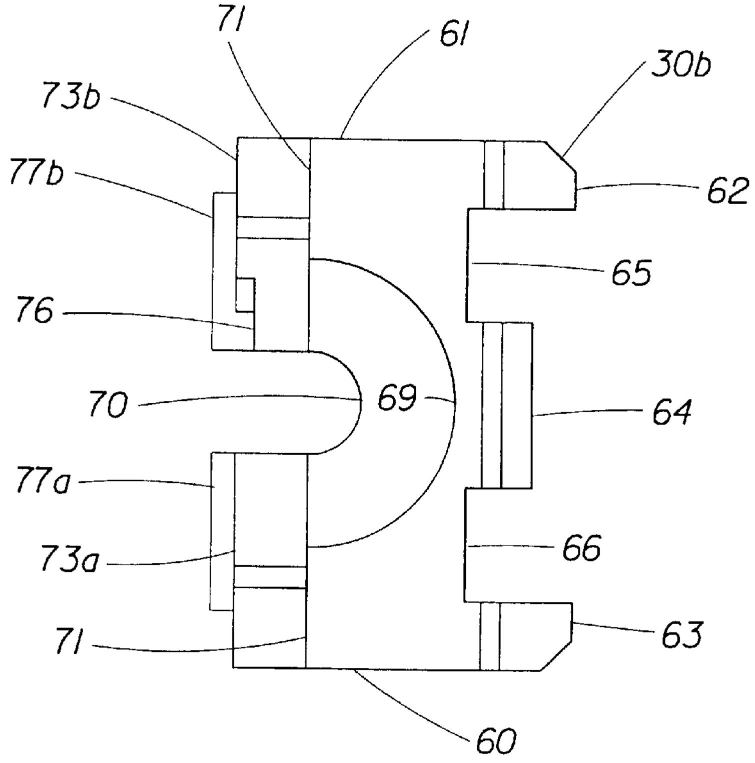
FIG. 18 is a rear end elevational view of the slide body left half.

As is most clearly shown in FIGS. 16, 17 and 18, the outer surface of the left slide body half 30*b* comprises a pair of longitudinally extending edge ribs 62 and 63, an intermediate rib 64 which does not extend as far outwardly as do the edge ribs 62 and 63, and a pair of grooves 65 and 66 formed between ribs 62 and 64 and ribs 64 and 63, respectively. The left slide body half 30*b* has a countersunk bore 67 formed in both rib 62 and notch 65. It is also provided with a threaded bore 68 formed in rib 64. The purposes of bores 67 and 68 will be apparent hereinafter.

Extending inwardly of its rearward end, the right slide body half 30*b* is provided with a semi-cylindrical bore 69, similar to the semi-cylindrical bore 36 of the right slide body half 30*a* (see FIG. 15). Bore 69 terminates in a smaller semicylindrical bore 70, corresponding to the semi-cylindrical bore 37 of the right slide body half 30*a*. In this instance, however, the bore 70 extends a considerable part of the length of the left slide body half 30*b*.

The bore 69 extends toward the exterior of the left slide body half 30*b* from a planar surface 71 which also contains a part of semi-cylindrical bore 70. The planar surface 71 has a hole 72 formed therein adapted to receive the locating pin 39 of the right slide body half 30*a*.

The planar surface 71 leads to a split planar surface 73*a* and 73*b* located to either side of semi-cylindrical bore 70. Planar surface 73*a* contains countersunk bore 67 (see FIG. 16) and an additional bore 74 adapted to receive locating pin 41 of right slide body half 30*a*. The surface portion 73*a* has a slightly depressed portion 75. Similarly, surface portion 73*b* has a depressed portion 76. The co-planar portion 73*a* and 73*b* lead to additional co-planar portions 77*a* and 77*b* which overlie the bore 52 and a small portion of the surface 45 of the right slide body half 30*a* The surface portions 77*a* and 77*b* each have an arcuate bore portion formed therein, as at 78*a* and 78*b,* respectively.

The forward ends of planar surfaces 77*a* and 77*b* terminate in a vertical, substantially arcuate wall 79 leading to a lower shelf 80 of substantially the same shape. The shelf 80 terminates in a vertical wall 81 leading to a substantially arcuate planar surface 82. At its forward end, the left side body half 30*b* is provided with a wall 83. The wall 83 has two planar portions 83*a* and 83*b* which are separated by an arcuate notch 84. The inside surface of wall 83 presents an arcuate wall 85 similar to wall 49 of the right slide body half 30*a* and forming with the wall 81 and the surface 82 a channel to receive a longitudinal edge of screw strip 8. This channel is generally indicated at 86. The channel has an entrance 87 for the screw strip 8 and an exit 88 for the screw strip 8, corresponding to the entrance 50 and the exit 51 of the right slide body half 30*a*. The wall 83 has an arcuate surface 83*c,* the purpose of which will be apparent hereinafter.

From the above description it will be apparent that when the right and left slide body halves 30*a* and 30*b* are assembled together, pins 39 and 41 of the right slide body half will enter the holes 72 and 74, respectively of the left slide body half. The semi-cylindrical bores 36 and 69 will form a rear cylindrical socket in the assembled slide 30 and the semi-cylindrical bores 37 and 70, as well as the notches 48 and 84 will provide a guide way for the tool driver, as will be evident hereinafter. The slide body halves are held together by a machine screw (not shown) countersunk in bore 67 in left slide body half 30*b* and threadedly engaged in threaded bore 42 of the right slide body half 30*b*.

Figure 19:
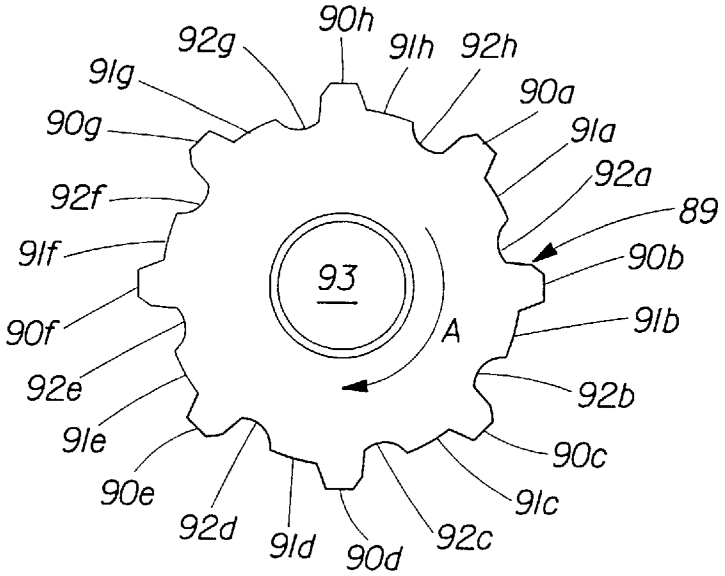
FIG. 19 is a left side elevational view of the feed sprocket of the present invention.
Figure 20:
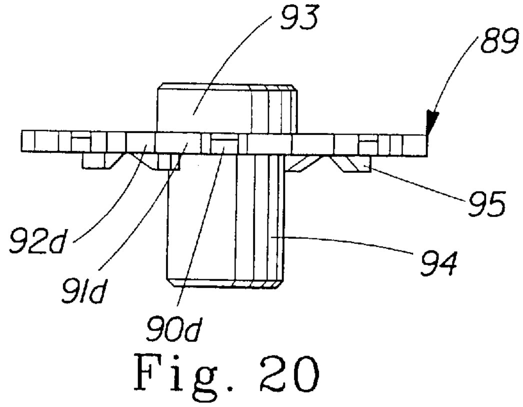
FIG. 20 is an edge elevational view of the feed sprocket as seen from the bottom of FIG. 19.
Figure 21:
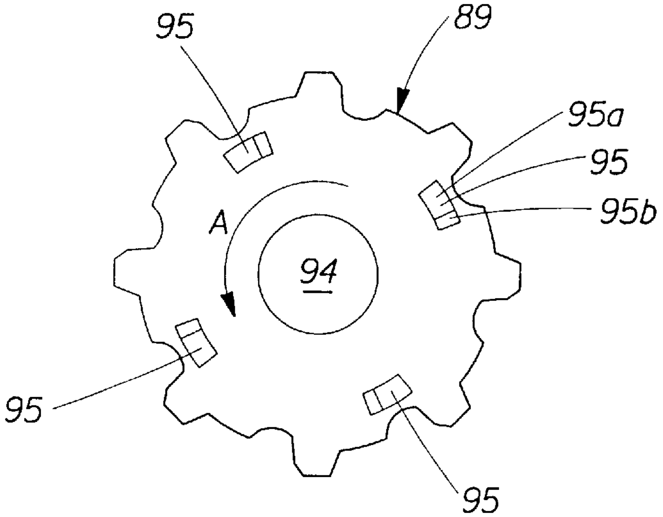
FIG. 21 is a right side elevational view of the feed sprocket.

Reference is now made to FIGS. 19, 20 and 21 wherein the feed sprocket of the present invention is illustrated. The sprocket is generally indicated at 89. FIG. 19 illustrates the left side of sprocket 89. It will be noted that the sprocket is provided with 8 teeth 90*a*–90*h*. Each of the teeth 90*a*–90*h* leads to an arcuate surface 91*a*–91*h*. Each arcuate portion 91*a*–91*h* leads to a notch 92*a*–92*h*. Each of the notches 92*a*–92*h* leads to the next adjacent sprocket tooth. FIG. 20 is a view of sprocket 89 as seen from the bottom of FIG. 19. It will be noted that the left side of the sprocket carries a central hub 93, while the right side carries a central shaft 94.

FIG. 21 illustrates the right side of the feed sprocket 89 and it will be noted that the right side carries four, evenly spaced, identical cam lugs 95. Each cam lug 95 has a gently sloping cam surface 95*a* facing in the direction of desired rotation indicated by arrows A and a steeply sloped cam surface 95*b* facing in a direction opposite the direction of desired rotation A.

Figure 22:
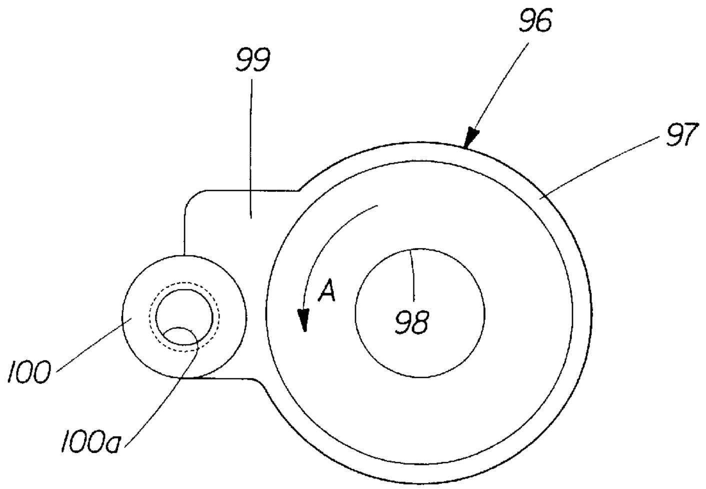
FIG. 22 is a right side elevational view of the feel pawl of the present invention.
Figure 23:
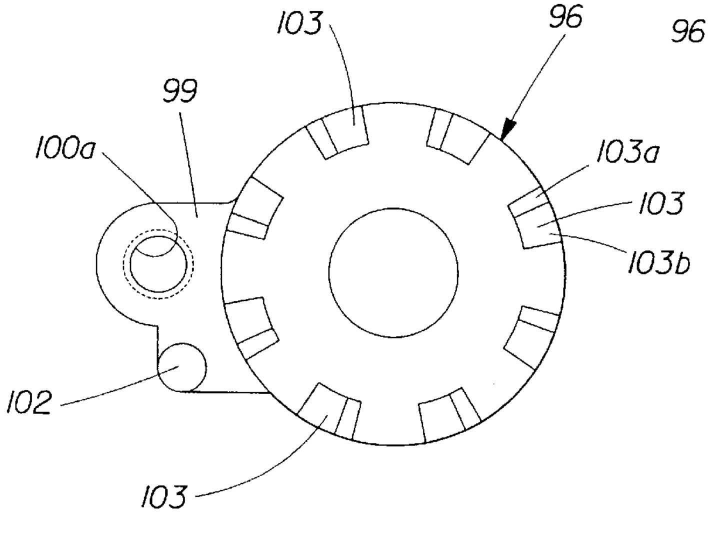
FIG. 23 is a left side elevational view of the feed pawl.
Figure 24:
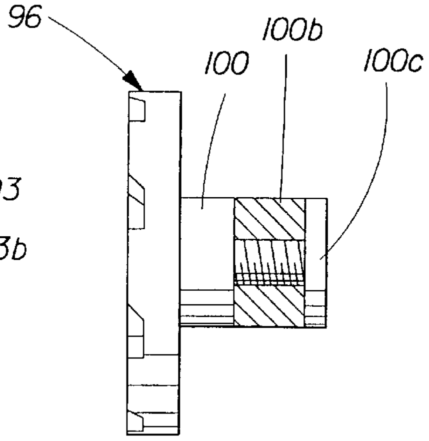
FIG. 24 is an edge elevational view of the feed pawl as seen from the right of FIG. 23.

Reference is now made to FIGS. 22, 23 and 24 wherein the feed pawl of the present invention is illustrated and is generally indicated at 96. FIG. 22 is a right side elevational view of feed pawl 96. It will be noted that the feed pawl 96 comprises a circular member having an annular rim 97 about most of its periphery and a central bore 98 of such diameter as to just nicely receive the shaft 94 of feed sprocket 89 and to be rotatable thereabout. Feed pawl 96 has an extension 99 which carries an annular boss 100 with a threaded bore 100*a*. A cam roller 100*b* is rotatively mounted on boss 100 by a machine screw 100*c* (see FIG. 24).

FIG. 23 is a left side elevational view of the feed pawl 96. It will be noted that the left side of extension 99 carries an upstanding circular post 102. The purpose of this post will be apparent hereinafter. The left side of feed pawl 96 has about its periphery eight cam depressions 103. The cam depressions 103 are identical. Each cam depression 103 comprises a steep cam surface 103*a* and a gently sloping cam surface 103*b*. The cam depressions 103 are open at the peripheral edge of the feed pawl 96. This is evident from FIG. 24 which is an edge elevational view of the feed pawl, as seen from the right of FIG. 23.

Reference is now made to FIG. 28 which is a cross-sectional view taken along section line 28—28 of FIG. 1. FIG. 28 illustrates the feed housing 10 and the right and left slide body halves 30*a* and 30*b* assembled to form slide body 30. The slide body 30 is slidably mounted in feed housing 10.

It will be noted that feed sprocket 89 is mounted within slide body 30 with its hub received in the partial bore portions 78*a* and 78*b* of the left slide body half 30*b* (see also FIG. 14). The shaft 94 of feed sprocket 89 is received in the bore 57 of the right slide body half 30*a*. The feed pawl 96 is shown rotatively mounted on the shaft 94 of feed sprocket 89. The left side of feed pawl 96 is urged into abutment with the right side of feed sprocket 89 by compression spring 104. The left end of compression spring 104 abuts the right side of feed pawl 96, while the right end of compression spring 104 abuts the annular shoulder 56 of the right slide body half 30*a* It will be noted in FIG. 28 that a diametric pair of the cam lugs 95 of feed sprocket 89 are located within a diametric pair of cam depressions 103 of feed pawl 96.

Figure 25:
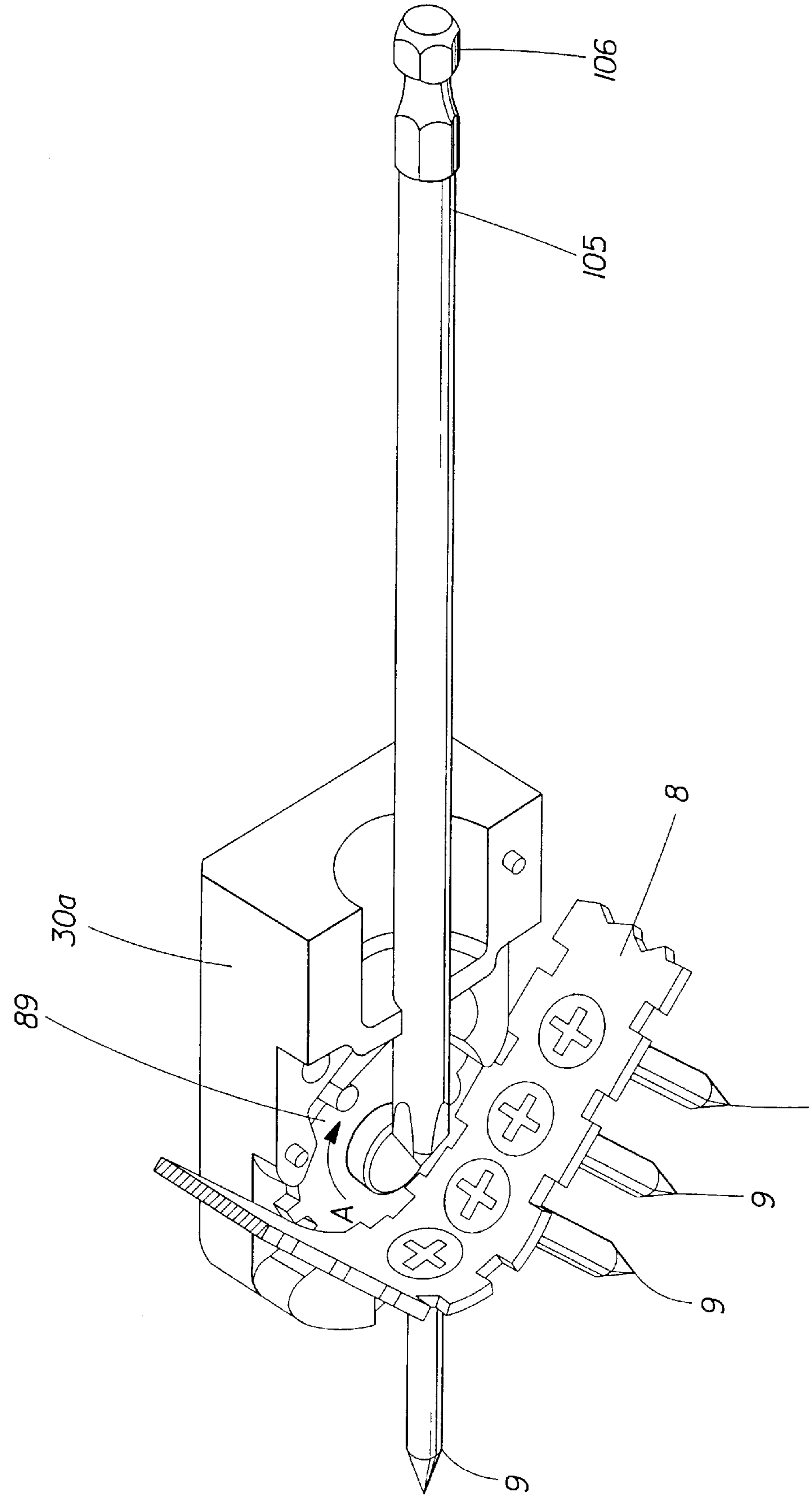
FIG. 25 is a fragmentary perspective view of the assembly of the right half of the slide body, the feed sprocket, a strip of screws and the screw driver.

FIG. 25 is a simplified perspective view illustrating the right slide body half 30*a* with the feed sprocket 89 mounted therein. The feed sprocket engages one longitudinal edge of a fragmentarily illustrated screw strip 8, carrying a plurality of screws. It will be understood that the feed sprocket 89 is incrementally rotated in the direction of arrow A in a manner to be described hereinafter. The forwardmost screw 9 on tape 8 is shown having been shifted to the proper position to be driven by driver 105. The driver 105 is illustrated as a Phillips head driver which, while preferred, does not constitute a limitation of the invention. The rearward end of driver 105 has a hexagonal periphery as at 106 to be received in the hexagonal bore of a clutch shaft (not shown). The prior art has devised a number of screw bearing tapes such as those shown in U.S. Pat. Nos. 5,339,713 and 5,402,695. Since the feed sprocket 89 engages only one longitudinal edge of tape 8, it need not have sprocket tooth-receiving notches along both of its longitudinal edges. As is evident from the drawings, however, a conventional screw tape with sprocket tooth-receiving notches on both longitudinal edges can be used.

Since only one edge of screw tape 8 is engaged by the teeth of the feed sprocket 89, the long axis of the driver 105 can intersect the axis of the feed sprocket 89 and can be coaxial with the long axis of the screw positioned to be driven.

The fact that the screw bearing strip 8 follows an arcuate path within slide body 30 adjacent the position occupied by a screw when ready to be driven, tends to better align the axis of a screw, positioned to be driven, with the axis of driver 105.

Figure 26:
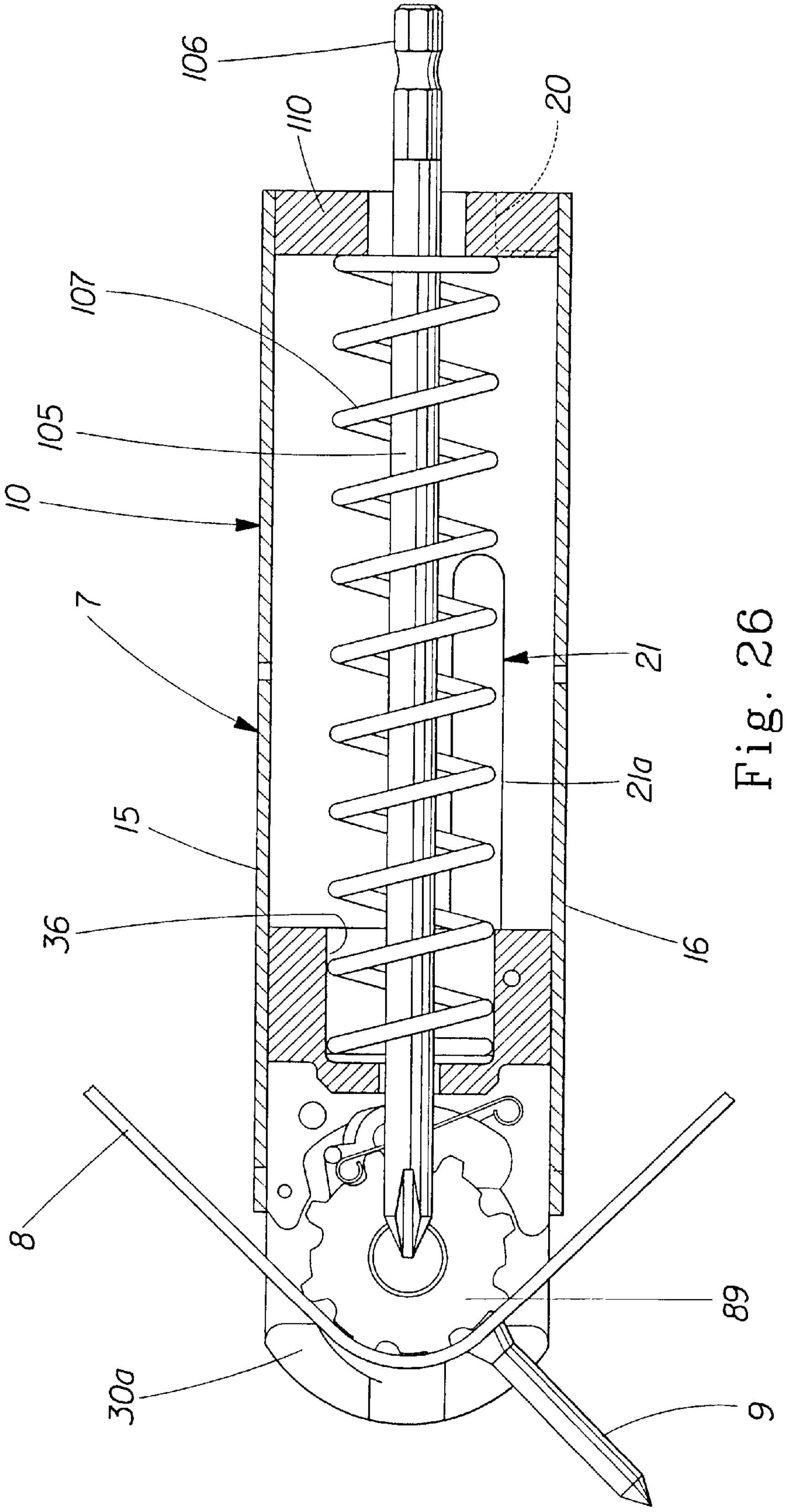
FIG. 26 is a cross-sectional elevational view showing the housing, the right side slide body half, the feed sprocket, the slide body spring, a screw bearing tape and the driver.

FIG. 26 is a view of the screw advancing mechanism and driver of the present invention as seen from the left side of feed housing 10, the left side of the feed housing having been removed. The right slide body half 30*a* is shown, and the left slide body half 30*b* has been removed. A fragmentary piece of screw strip is shown at 8, together with a screw 9. The feed sprocket 89 is shown, as is the driver 105. It will be remembered that the slide body 30 (the right half 30*a* of which is shown in FIG. 26) is shiftable longitudinally within feed housing 10. It will be understood that the slide body 30 is biased to its forwardmost position (shown in FIG. 26) by a compression spring 107. Compression spring 107 enters the socket 36/69 of the slide body 30 and abuts the end thereof. The other end of compression spring 107 abuts an end plate of feed housing 10, to be described hereinafter. What determines the forwardmost position of the slide body 30 will be apparent hereinafter.

Figure 27:
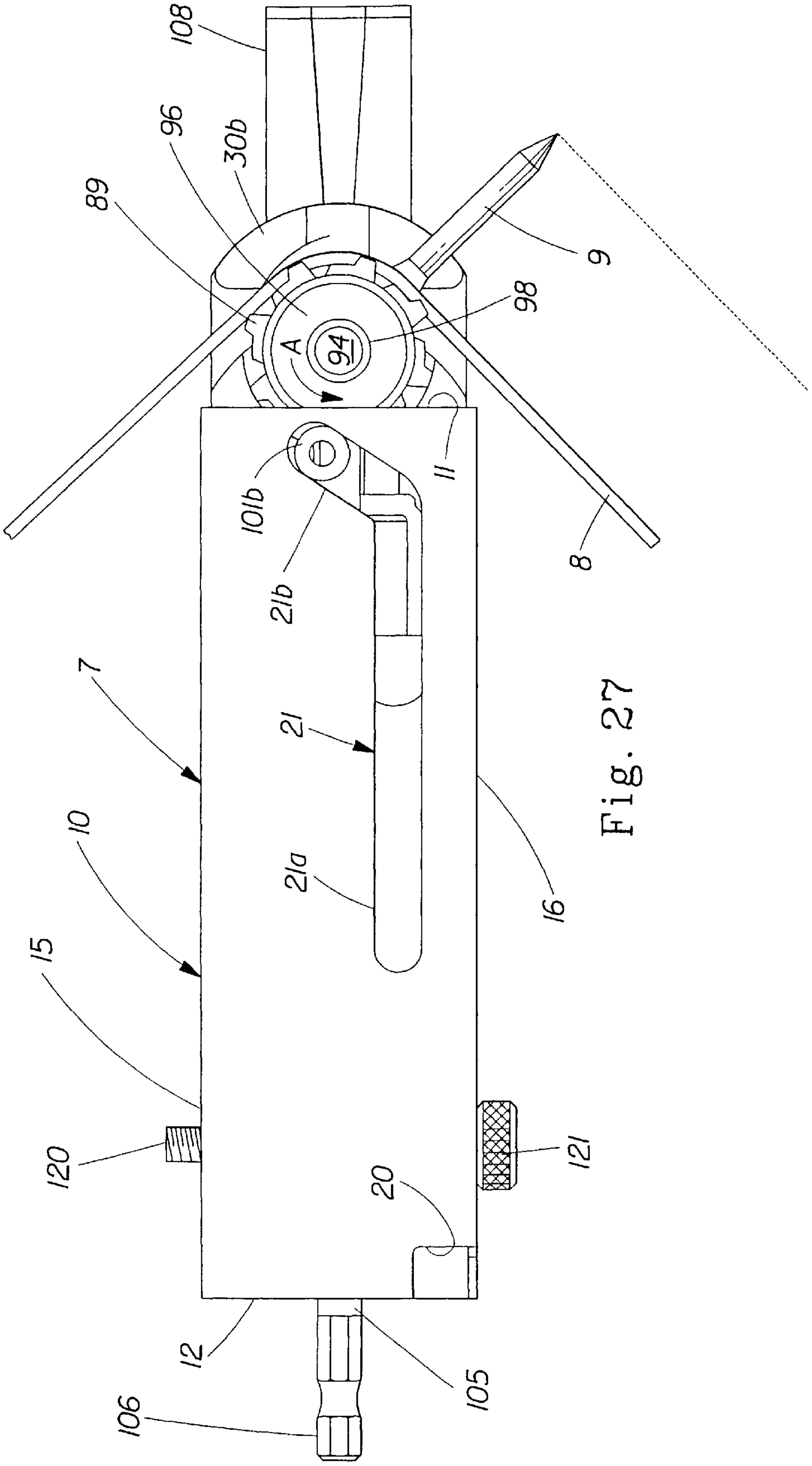
FIG. 27 is a right side elevational view of the screw driver and feed assembly of the present invention.

Reference is now made to FIG. 27 which is a right side elevational view of the nail feeding mechanism and the driver of the present invention. Feed housing 10 is shown with its right side 14 containing slot 21. Extending from the forward end of feed housing 10 the left slide body half 30*b* is shown, the right slide body half 30*a* having been removed. Feed sprocket 89 is illustrated with feed pawl 96 mounted on the feed sprocket shaft 94. Feed pawl cam roller 100*b*, is located in feed housing slot 21. Left slide body half 30*b* is shown in its forwardmost position. A screw strip 8 is fragmentarily shown together with the forwardmost screw 9 thereon, ready to be shifted to its driving position. Finally, the left slide body half 30*b* has a contact foot 108 affixed thereto. The contact foot 108 is cause to contact the surface into which screw 9 is to be driven. As the tool 1 is shoved toward the surface, contact foot 108 will cause the slide body (represented by slide body half 30*b*) to shift rearwardly into the feed housing 10, against the urging of compression spring 107 (see FIG. 26). This will cause cam roller 100*b* to roll through portion 21*b* of slot 21 causing a partial rotation of feed pawl 96 in the direction of arrow A. Once the cam roller has reached portion 21*a* of slot 21, further rotation of feed pawl 96 will stop.

By virtue of the interaction of the steep cam surfaces 103*a* of cam depressions 103 with the steep portions 95*b* of the cam lugs 95 of feed sprocket 89, the feed sprocket will be rotated in the direction of arrow A by the same increment as the feel pawl. This increment is designed to move screw 9 from the position shown in FIG. 27 to a position to be driven by driver 105. Further advancement of tool 1 toward the surface to receive the screw will cause the screw to be driven into the surface.

When the tool 1 is moved away from the surface into which screw 9 has been driven, the compression spring 107 will shift the slide body 30 (represented by slide body half 30*b*) to its normal position illustrated in FIG. 27. This will cause cam roller 101 to return to its normal position shown in FIG. 27. As a result of this, feed pawl 96 will be rotated to its normal position, the roller cam causing the feed pawl to return to its normal position by rotating in a direction opposite to the direction indicated by arrow A. Means, to be described hereinafter, prevent the feed sprocket from rotating with feed pawl 96 in a direction opposite the direction of arrow A.

Since the feed sprocket 89 is precluded from rotating in a direction opposite that indicated by arrow A, and since feed pawl 96 will be rotated in a direction opposite arrow A to its normal position when cam roller 100*b* returns to its normal position within slot portion 21*b,* the feed pawl 96 must become disengaged from feed sprocket 89. This is possible because return of feed pawl 96 to its normal position will cause the gently sloped cam surface 103*b* of the cam depressions 103 to ride along the gently sloped cam surfaces 95*a* of the cam lugs 95 of feed sprocket 89 allowing feed pawl 96 to slip out of engagement with feed sprocket 89 against the action of compression spring 104.

Figure 29:
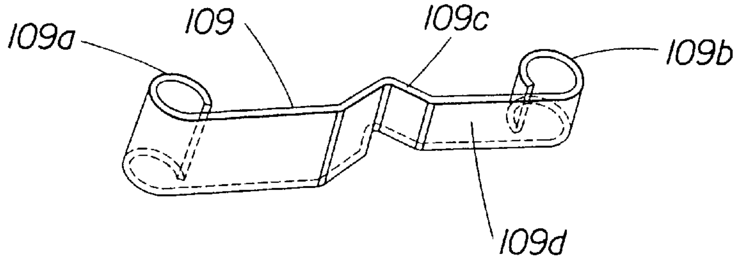
FIG. 29 is a perspective view of the feed sprocket spring of the present invention.
Figure 30:
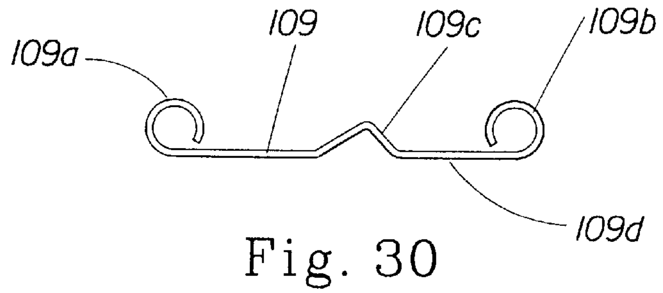
FIG. 30 is a top view of the feed sprocket spring.

Reference is now made to FIGS. 29 and 30 wherein the means is shown which prevents rotation of feed sprocket 89 in a direction opposite the direction of arrow A. The means comprises a leaf spring 109. The ends of the leaf spring 109 are coiled as at 109*a* and 109*b*. Between ends 109*a* and 109*b* the spring is provided with a V-shaped bend 109*c*. As is best shown in FIG. 29, that portion 109*d* of leaf spring 109 which extends from about the middle of the V-bend 109*c* to end 109*b* is narrower than the rest of the leaf spring.

Figure 31:
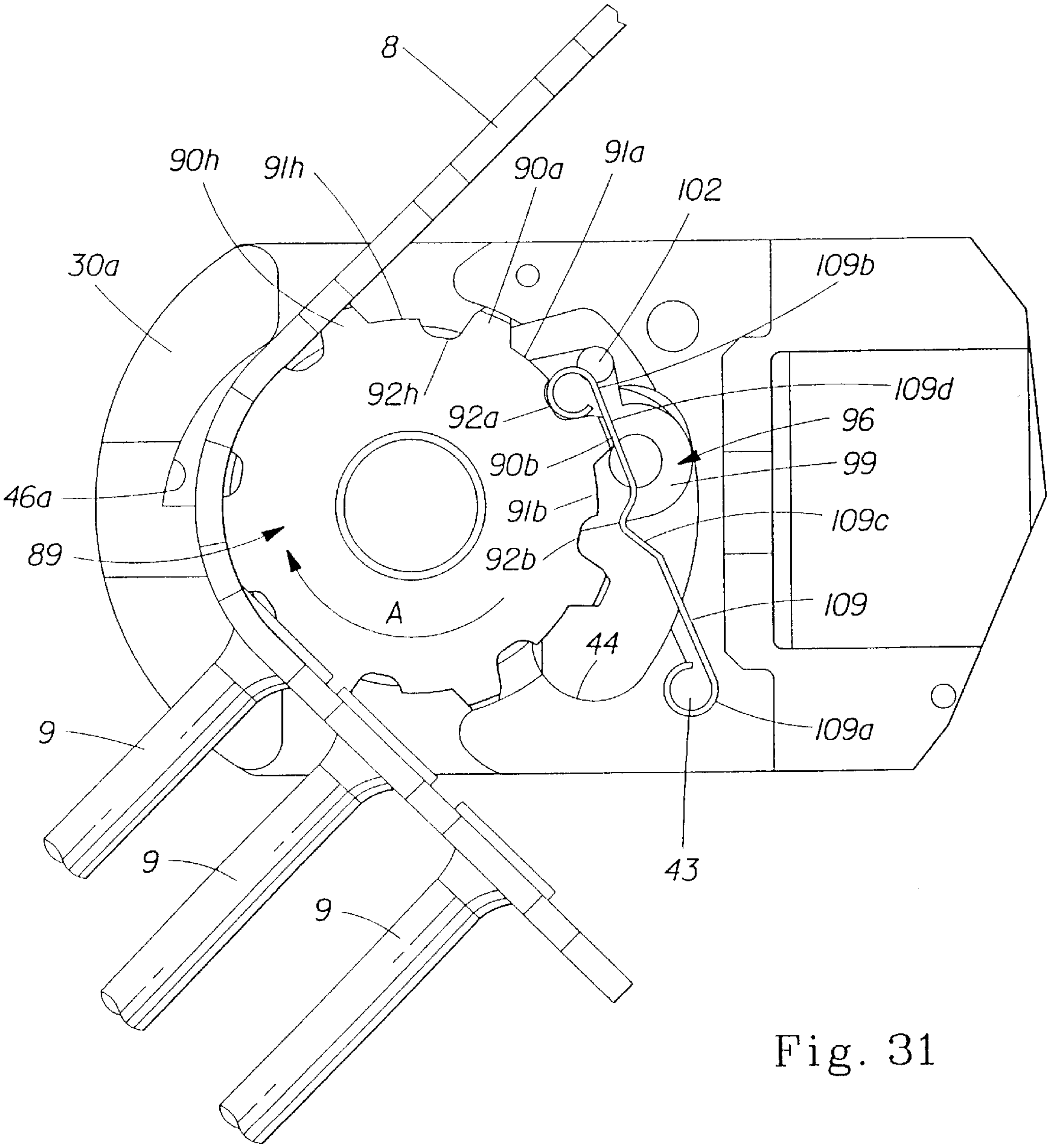
FIGS. 31, 32 and 33 illustrate the operation of the feed sprocket and the feed sprocket spring.

FIG. 31 illustrates slide body right half 30*a* together with screw strip 8 bearing screws 9. Feed sprocket 89 is mounted in slide body right half 30*a* together with the feed pawl, the extension 99 of which is visible. The extension post 102 is also shown. It will be understood that the extension 99 carries cam roller 100*b* which extends through the arcuate slot 44 of the slide body right half 30*a* and into the slot 21 of feed housing 10 (see FIG. 27).

Figure 32:
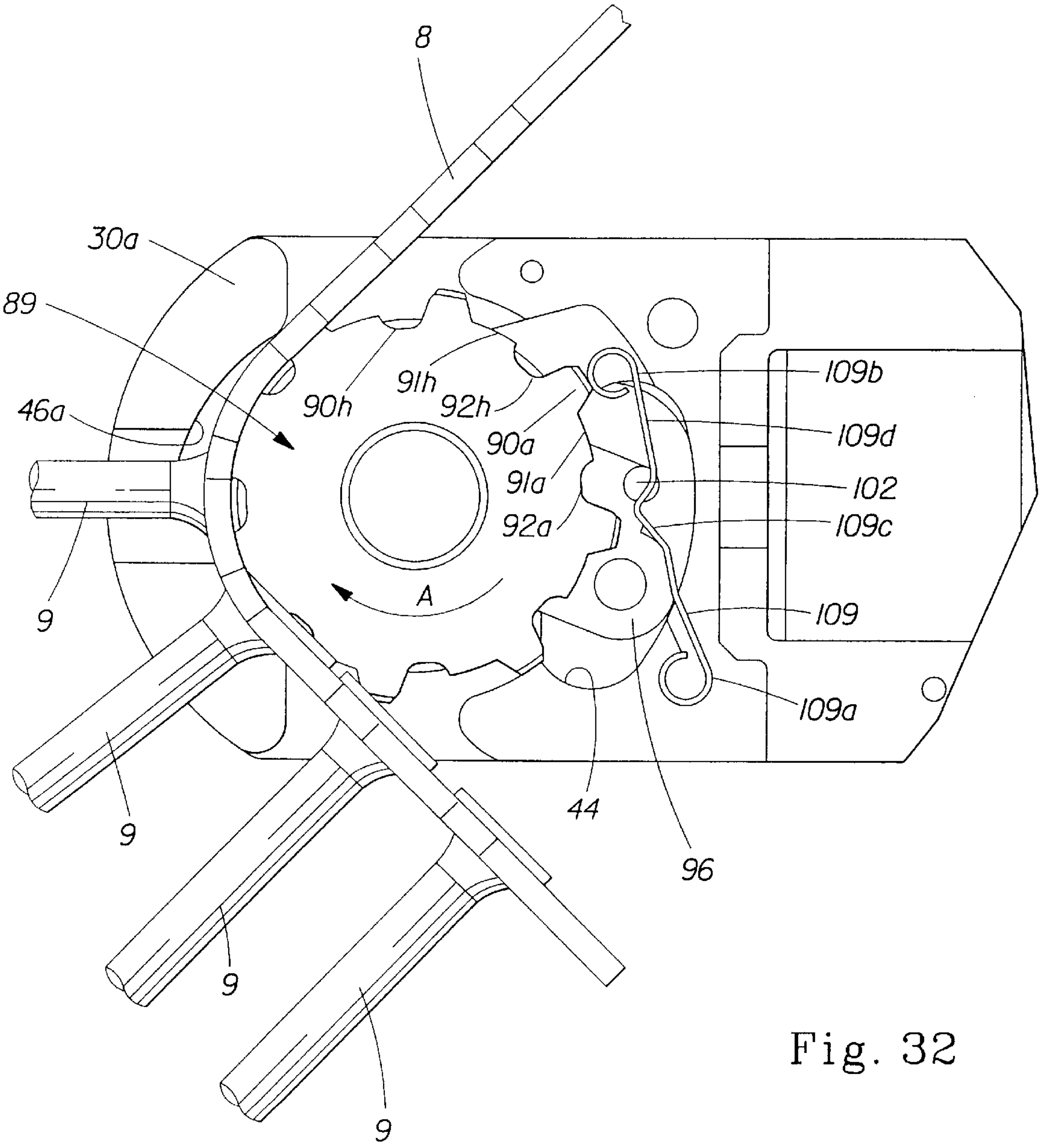

In FIG. 31, it may be assumed that screw feed and driver assembly 7 is ready to shift the next screw into driving position. It will be noted that the end 109*a* of leaf spring 109 is mounted in the slot 43 of the slide body right half 30*a*. The free end 109*b* of leaf spring 109 is located in the notch 92*a* of feed sprocket 89. This engagement of spring end 109*b* in notch 92*a* will preclude movement of the feed sprocket 89 in a direction opposite direction A. When the tool operator is ready to drive a screw into a workpiece such as a sheet of drywall or the like, he will cause contact foot 108 to abut the workpiece at the appropriate position for driving the screw. As is apparent from FIG. 27, and as set forth above, this will cause slide body 30 (made up of halves 30*a* and 30*b*) to shift inwardly within feed housing 10 against the action of compression spring 107 (see FIG. 26). Simultaneously, cam roller 100*b,* mounted on feed pawl 96 will start its travel along the portion 21*b* of slot 21. This will cause the feed cam 96 to shift in arcuate slot 44 as shown in FIG. 32, while simultaneously shifting in the portion 21*b* of slot 21 of feed housing 10. Feed sprocket 89 will rotate with feed pawl 96 by virtue of the inter-engagement of feed sprocket cam lugs 95 and feed pawl cam depressions 103. The feed sprocket cam lugs 95 will not ride out of the feed pawl cam depressions since feed sprocket cam lug steep surfaces 95*b* abut the feed pawl cam depression steep surfaces 103*a.*

As the feed pawl 96 and feed sprocket 89 rotate in the direction of arrow A together, it will be noted that the end 109*b* of leaf spring 109 shifts out of feed sprocket notch 92*a,* along feed sprocket arcuate surface 91*a,* and over feed sprocket tooth 90*a*. At the same time, it will be noted that feed pawl post 102 passes beneath the narrow portion 109*d* of leaf spring 109.

Figure 33:
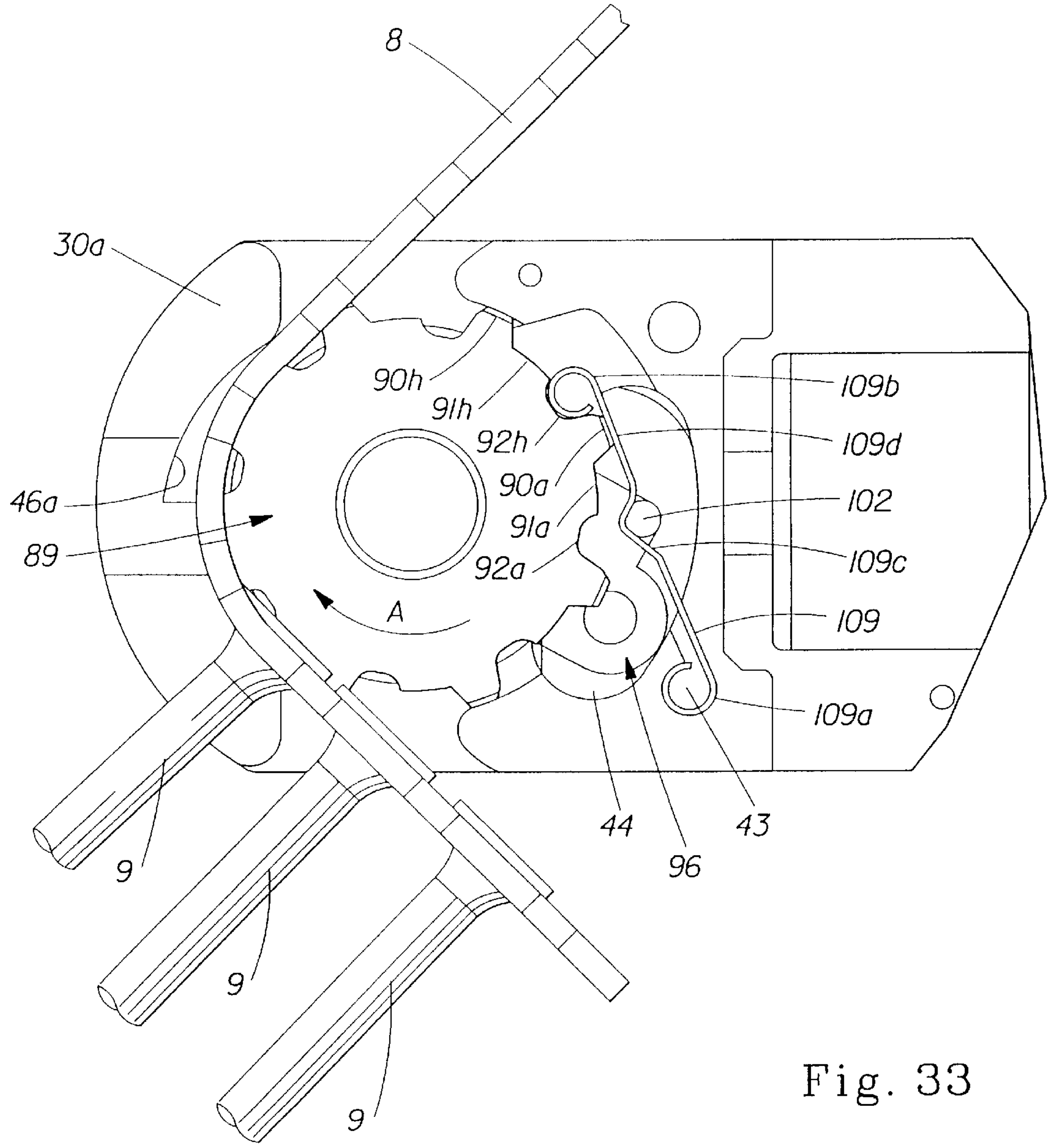

Reference is now made to FIG. 33 wherein the feed pawl 96 has been rotated to its maximum position in slot 44 which means that the feed pawl cam roller 101*b* has reached the juncture of portions 21*a* and 21*b* of feed housing slot 21. The feed cam and the feed sprocket have rotated to a position wherein the forwardmost screw 9 is positioned to be driven by driver 105 and the free end 109*b* of leaf spring 109 has slipped into the next feed sprocket notch 92*h.* In the meantime, the feed pawl post 102 engages the wide part of leaf spring 109 at detent 109*c*. At this point, the feed sprocket 89 is not only precluded from rotating in a direction opposite arrow A, but also is locked in that condition by the interaction of the feed pawl post 102 and the leaf spring detent 109*c.*

As the tool 1 is pressed further toward the workpiece, the slide body (represented by right half 30*a* in FIG. 32) will continue to shift into feed housing 10 and the feed pawl cam roller will ride toward the closed end of the portion 21*a* of feed housing slot 21.

Once the screw has been driven into the workpiece, the tool will be pulled away from the workpiece by the operator causing cam roller 100*b* of feed pawl 96 to return to the juncture of portions 21*a* and 21*b* of feed housing slot 21. From this juncture to its normal position shown in FIG. 27, the cam roller will cause the feed pawl to rotate in a direction opposite direction A to its normal position. Feed sprocket 89 will remain in the position shown in FIG. 32 since it is precluded from rotating in a direction opposite arrow A by engagement of the free end 109*b* of leaf spring 109 in feed sprocket notch 92*h.* When the feed pawl 96 rotates in a direction opposite direction A and the feed sprocket 89 remains stationary, this is made possible by the gently sloped portions 103 of the feed pawl cam depressions 103 riding up the gently sloped portions 95*a* of the feed sprocket cam lugs 95, repeatedly disengaging the feed sprocket cam lugs from the feed pawl cam depressions against the action of compression spring 104 (see FIG. 28), until the feed pawl reaches its normal position and slide body 30 has reached its normal position under the influence of compression spring 107. At this point, the entire screw locating and driving operation is ready to be repeated.

Wall surface 46*a* of slide body half 30*a* and wall surface 83*c* of slide body half 30*b* overlie each other when the halves 30*a* and 30*b* of slide body 30 are assembled. If the forwardmost end of tape 8 is located at the position of a pair of opposed sprocket notches in the longitudinal tape edges, the forwardmost tape end will constitute a tab narrower than the overall width of the tape. As the tape is inserted in the passage therefor formed in the slide body 30, this tab will tend to enter the notches 48 and 84 at the forward ends of the slide body halves 30*a* and 30*b*. Surfaces 46*a* and 83*c* will redirect this forwardmost tab portion of tape 8 into the tape passage of the slide block 30.

Figure 34:
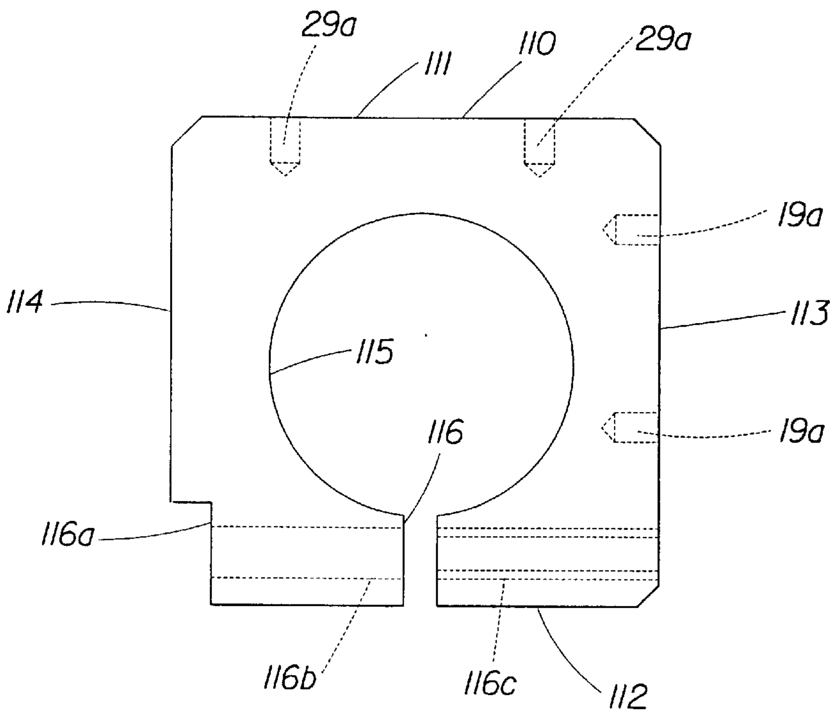
FIGS. 34 and 35 are, respectively, a front elevation and a right side elevation of the feed housing mounting plate of the present invention.
Figure 35:
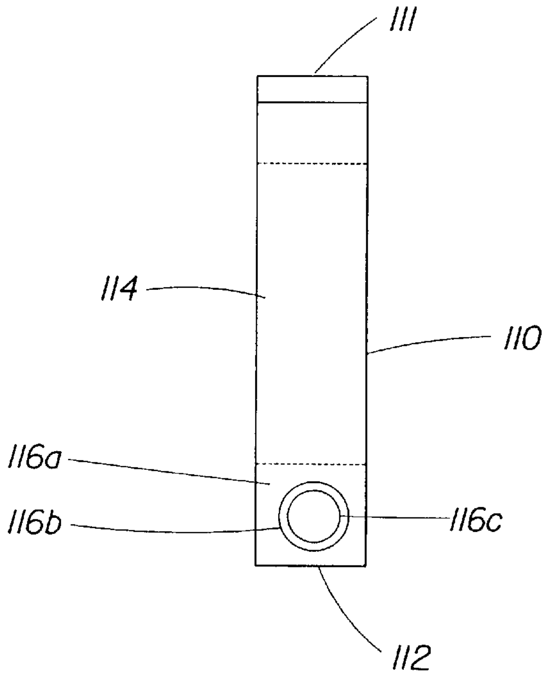

Reference is now made to FIGS. 34 and 35 wherein the feed housing mounting plate 110 is shown. Mounting plate

110 is a substantially rectangular member of uniform thickness having a top edge 111, a bottom edge 112, a left edge 113 and a right edge 114. Mounting plate 110 has a central circular opening 115 connected to the periphery of the mounting plate by a radial slot 116. The top edge 111 of mounting plate 110 is provided with a pair of threaded bores 29*a* corresponding to the unthreaded bores 29 of the feed housing top surface 15 (see FIG. 7). In a similar fashion, the left side 113 of mounting plate 110 is provided with a pair of threaded perforations 19*a,* corresponding to the unthreaded perforations 19 of the left side of feed housing 10 (see FIG. 3). Machine screws (not shown) pass through clearance bores 29 into threaded bores 29*a* and through clearance bores 19 into threaded bores 19*a* whereby the mounting plate is attached within the feed housing 10 adjacent the rearward end 12 thereof. The mounting plate 110 is completed by the provision of a notch 116*a,* a clearance bore 116*b* and a threaded bore 116*c.* The clearance bore 116*b* and threaded bore 116*c* are coaxial. A machine screw (not shown) passes through clearance bore 116*b* and threadedly engages in threaded bore 116*c.* The head of the machine screw abuts the notch 116*a* causing the slot 116 to narrow and the circular hole 115 to contract. In this way, the screw feed and driver assembly 7 can be clamped in position on an appropriate adapter surface of tool 1.

Figure 36:
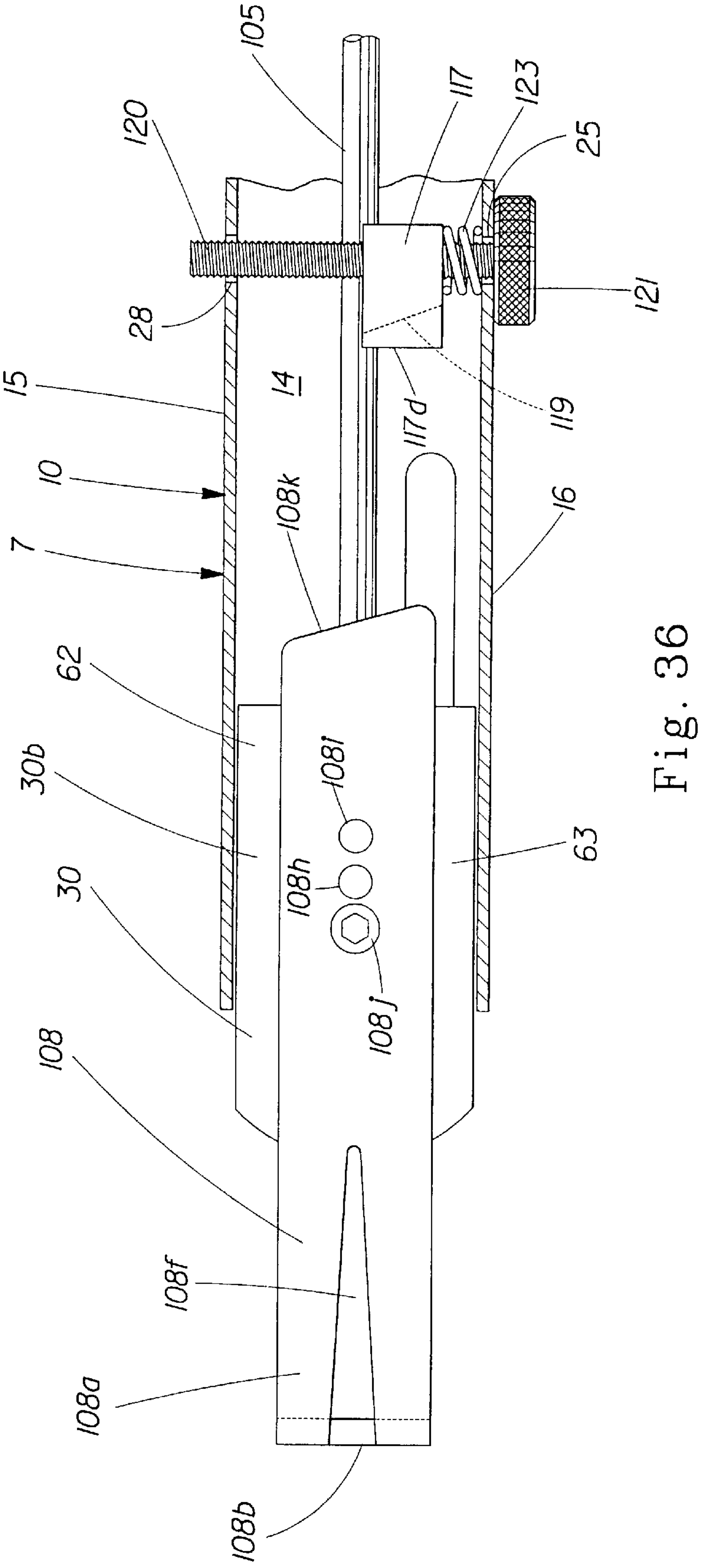
FIG. 36 is a simplified left side elevational view, partly in cross-section, illustrating the feed housing, the slide body, the adjustable contact foot, the driver and the depth of drive adjustment mechanism.

In FIG. 36, the feed housing 10 is shown with its right wall removed. Slide body 30 is illustrated within feed body 10. as is driver 105. The contact foot 108 is illustrated affixed to the right half 30*b* of slide body 30. The contact foot 108 is of such width that it is just nicely received between the ribs 62 and 63 of the exterior surface of slide body half 30*b.*

Figure 40:
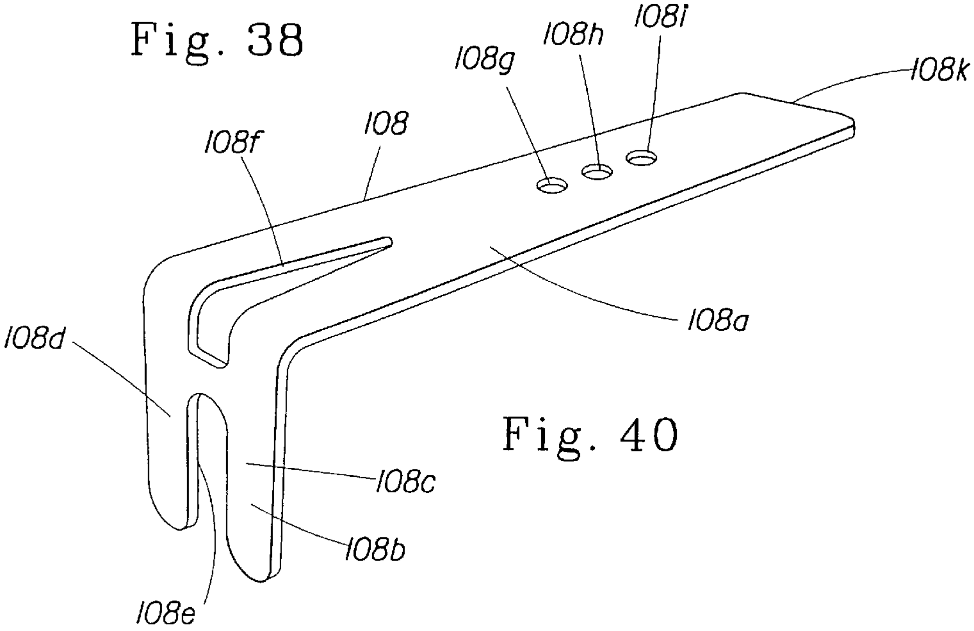
FIG. 40 is a perspective view of one embodiment of a contact foot of the present invention.

Reference is now made to FIG. 40, as well as FIG. 36. FIG. 40 is a perspective view of contact foot 108. It will be noted that the contact foot 108 is made of sheet metal and is of the same thickness throughout. Contact foot 108 is L-shaped, having an elongated first body portion 108*a* terminating in a short forward portion 108*b* extending at right angles to the portion 108*a.* The portion 108*b* is made up of a pair of bifurcations 108*c* and 108*d* with a slot 108*e* therebetween to accommodate a screw being driven into a workpiece. Extending partly in portion 108*b* and partly in portion 108*a* there is an elongated opening 108*f* enabling the viewing of a screw to be driven from the right side of tool 1. Finally, contact foot 108 is provided with three perforations 108*g,* 108*h* and 108*i.* The contact foot 108 can be attached to the exterior surface of the left half 30*b* of slide body 30 by means of a socket head cap screw 108*j,* or the like, passing through one of the contact foot perforations 108*g,* 108*h* or 108*i* and threadedly engaged in the threaded bore 68 (see FIG. 16) of the left half 30*b* of slide body 30. This is illustrated in FIG. 36 wherein the hex head bolt 108*j* is located in the forwardmost perforation 108*g* of contact foot 108. In this way, the screw feed and driver assembly 7 of FIG. 36 can accommodate three sizes of screws. For example, perforations 108*g,* 108*h* and 108*i* may be so positioned as to enable the accommodation of 1¾" screws, 1½" screws, 1¼" screws, respectively. It will be understood that contact foot 108 may be provided with more than three such perforations, if more than three sizes of screws are to be accommodated. The contact foot 108 is completed by being provided with a transversely angled rear edge 108*k.*

Adjustment for the length of screw used is, as has been described above, made by selecting the proper one of contact foot perforations 108*g,* 108*h* and 108*i* through which to locate socket head cap screw 108*j.* In this way, the contact foot 108 is affixed to slide body 30. Rotation of the contact foot 108 about socket head cap screw 108*j* is precluded by ribs 62 and 63 of the right side 30*b* of slide body 30, as is evident from FIG. 36. The transversely angled rear edge 108*k* of contact foot 108, in cooperation with an adjustable stop block 117 (next to be described) enables a fine adjustment of the depth of drive of the screw of desired length used.

Figure 37:
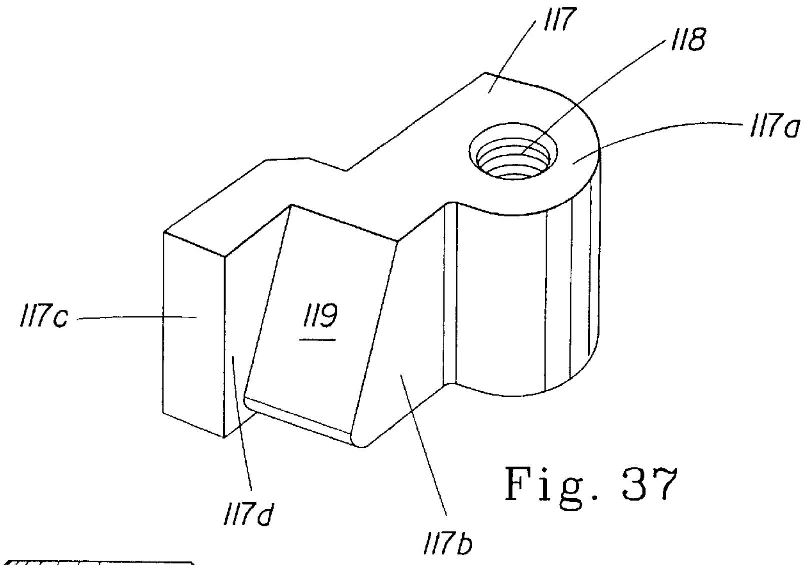
FIG. 37 is a perspective view of the adjustable stop block of the present invention.

As is best shown in FIG. 37, the adjustable stop block has a main body portion 117*a* containing a transverse finely threaded bore 118. The main body portion 117*a* has a forward extension 117*b* terminating in a transversely angled surface 119. As is apparent from FIGS. 36 and 43, the transversely angled surface 119 of adjustable stop block 117 is parallel to the transversely angled rear edge 108*k* of contact foot 108. The adjustable stop block portion 117*b* is surmounted by a portion 117*c* which overlies and extends slightly forwardly of transversely angled surface 119, forming a sort of lip 117*d.*

Figure 38:
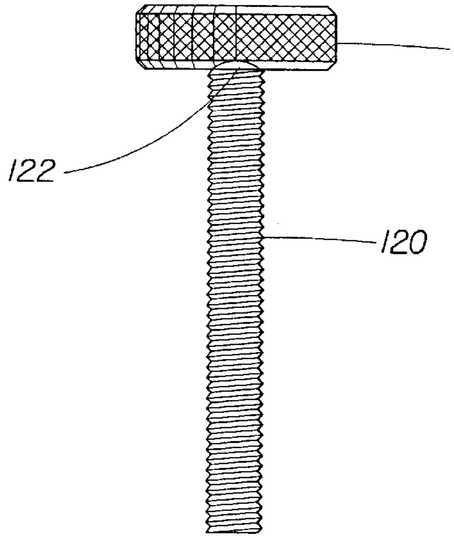
FIG. 38 is a side elevational view of the depth of drive adjusting screw.
Figure 39:
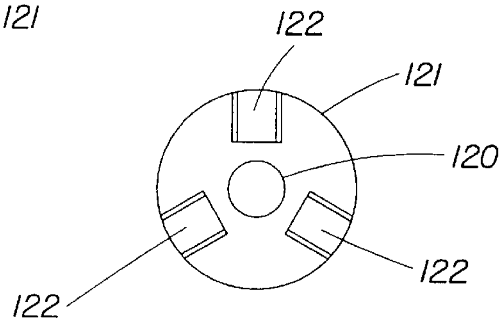
FIG. 39 is a bottom view of the adjusting screw of FIG. 38.

Reference is now made to FIGS. 38 and 39. These Figures illustrate a finely threaded bolt 120 having a knob-like head 121, the periphery of which is knurled so that it can be conveniently rotated manually. FIG. 39 is a bottom view of bolt 120 and head 121. It will be noted that the underside of head 121 is provided with three evenly spaced shallow notches 122 the purpose of which will be apparent hereinafter.

As is most clearly shown in FIG. 36, the finely threaded bolt 120 passes through the clearance bore 25 in the bottom 16 of feed housing 10 (see FIG. 6). A compression spring 123 is mounted on bolt 120 and the adjustable stop block 117 is threadedly engaged on the bolt. The free end of the bolt passes through clearance bore 28 in the top 15 of feed housing 10. It will be noted from FIG. 36 that one end of compression spring 123 abuts the inside surface of the bottom 16 of feed housing 10, while the other end of the compression spring abuts the side of the main body portion 117*a* of adjustable stop block 117.

Figure 43:
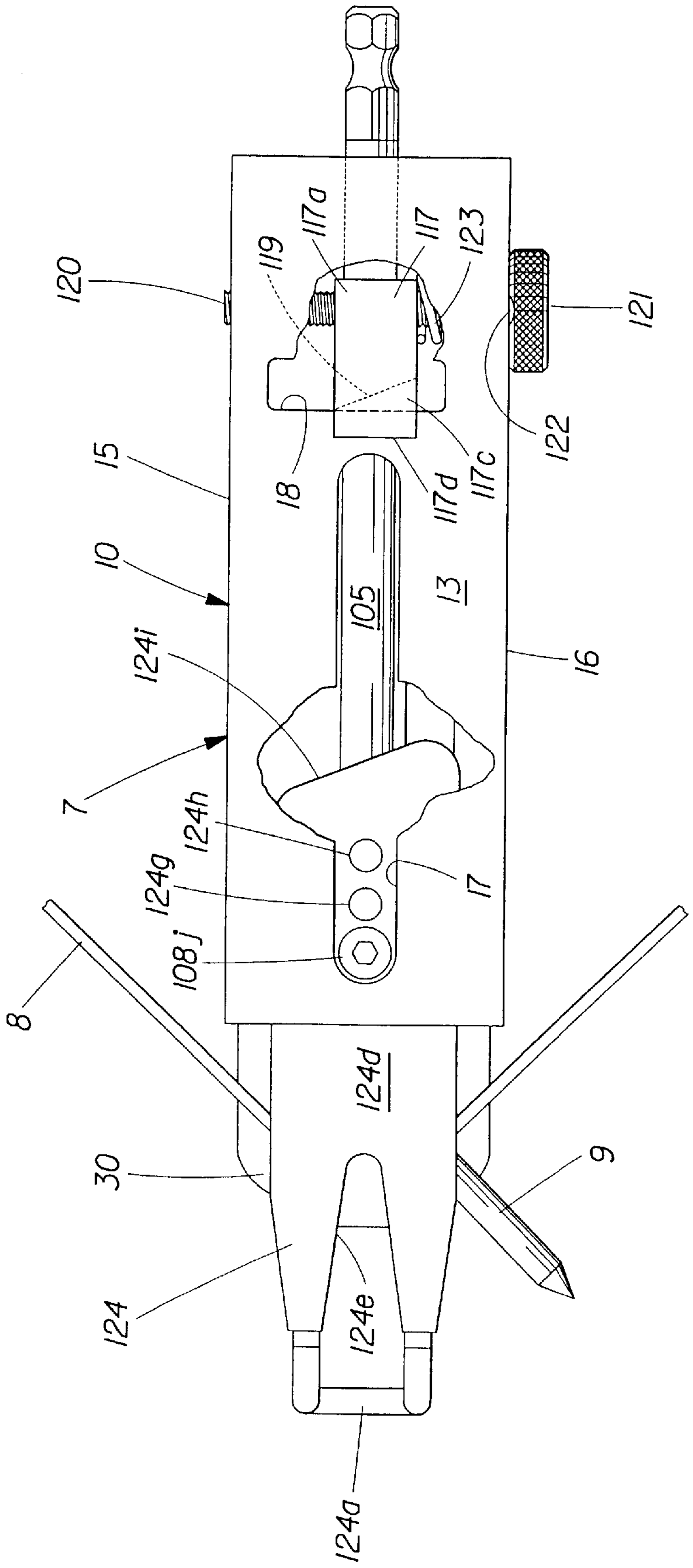
FIG. 43 is a left side elevational view of the assembly of the feed housing, the slide body halves, a nail bearing tape, the adjustable contact foot, the driver and the depth of drive adjustment mechanism, with part of the housing broken away.

Reference is now made to FIG. 43. It will be noted that the portion 117*c* of adjustable stop block extends through the transverse slot 18 in the left side 13 of feed housing 10. The lip portion 117*d* overlies the outer surface of left side 13 of feed housing 10. The extension of portion 117*c* through slot 18, the overlying of the side 13 of feed housing 10 by lip portion 117*d* and the passage of bolt 120 through the main body portion 117*a* of adjustable stop block 117 assures that the adjustable stop block 117 will maintain its proper orientation.

Turning to FIG. 36, it will be understood that the maximum depth to which slide body 30 will slide into feed housing 10 is determined by the abutment of the transversely angled rear edge 108*k* of contact foot 108 and the transversely angled surface 119 of adjustable stop block 117. As is shown in FIG. 36, the edge 108*k* and the surface 119 are parallel. As will be evident, when the adjustable stop block 117 is at its extreme lower position (i.e. nearest bottom 16 of feed housing 10 on bolt 120, the contact foot 108 and the slide body 130 will shift into feed housing 10 a minimum distance. Similarly, when adjustable stop block 117 is at its nearest position adjacent the top 15 of feed housing 10, the contact foot and the slide block 30 will enter into feed housing 10 their maximum distance. Since the threads of bolt 120 are fine, as are the cooperating threads of adjustable stop block bore 117, the adjustment of the stop block 117 along bolt 120 can be made with considerable precision.

It will be remembered that the bottom 16 of the feed housing 10 is provided with a detent 26 adjacent the bore 25 (see FIG. 6). This detent cooperates with the shallow notches 122 on the knob-like head 121 of bolt 120. As the head 121 is turned manually, the compression spring 23 will assure that the detent 26 will engage each notch 122. This allows the operator to know each time he has turned the head 121 one-third of a turn or 60°. It will also assure that the adjustable stop has been located in a desired position to adjust the depth of drive to a desired amount, the adjustable step block will maintain that position by the cooperation of one of the shallow notches 122 and the detent 26.

Figure 41:
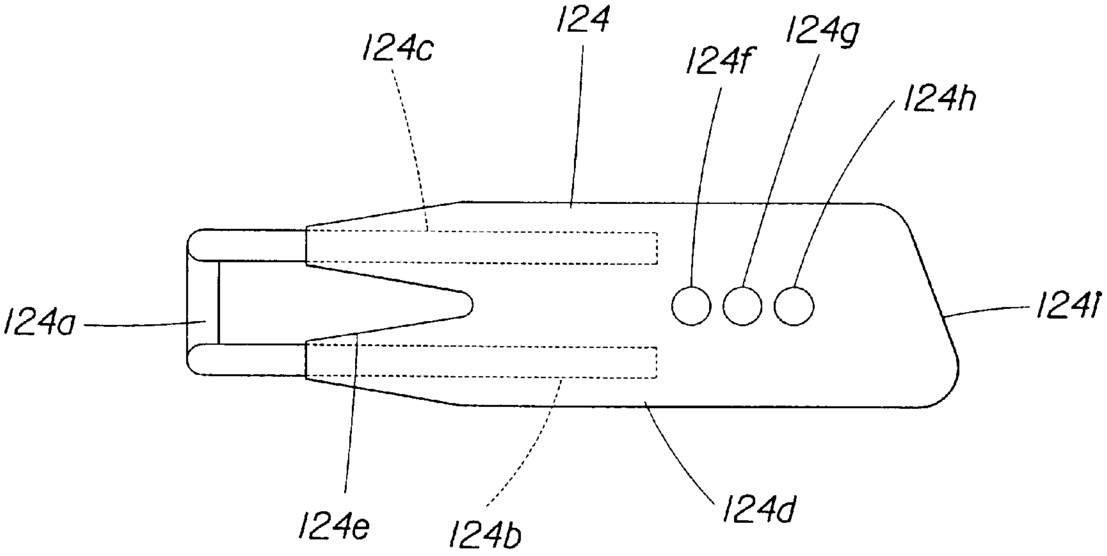
FIG. 41 is a top view of a second embodiment of the contact foot of the present invention.
Figure 42:
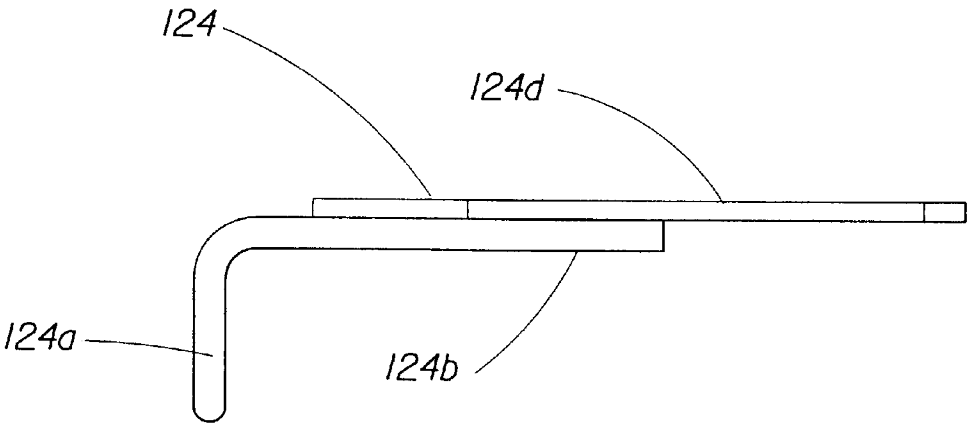
FIG. 42 is a side elevational view of the contact foot of FIG. 41, as seen from the bottom of that Figure.

Reference is now made to FIGS. 41 and 42. These Figures illustrate a preferred embodiment 124 of the contact foot. The contact foot 124 again has a L-shaped configuration. The short leg 124*a* of the contact foot 124 comprises a U-shaped wire member 124*a*. The legs of the U-shaped member 124*a* have extended portions 124*b* and 124*c* lying at 90° to the U-shaped portion 124*a*. The outside edges of these extensions are welded to a plate-like body 124*d*. The plate-like body 124*d* has a notch 124*e* formed therein, serving the same purpose as the notch 108*f* of contact foot 108. It will be understood that the U-shaped portion 124*a* will accommodate the screw being driven. The body 124*d* of contact foot embodiment 124 is provided with three perforations equivalent to perforations 108*g*–108*i* of contact foot 108 and indicated in FIG. 41 at 124*f*, 124*g*, and 124*h*. It will be understood that the perforations 124*f*–124*h* f FIG. 41 serve the same purpose as perforations 108*g*–108*i* of FIG. 40. Body portion 124*d* terminates in a transversely angled rear edge 124*i*, similar to and serving the same purpose as the transversely angled edge 108*k* of contact foot 108. The welding of leg extensions 124*b* and 124*c* to body portion 124*d* is clearly shown in FIG. 28.

FIG. 43 shows the screw feed and driver assembly 7 provided with contact foot 124. Again, the socket head cap screw 108*j* may be located in any desired one of threaded perforations 124*f*, 124*g*, and 124*h*, to accommodate the length of screw being used.

It will be noted from FIG. 43 that the head of socket head cap screw 108*j* extends through the longitudinal slot 17 in the left side 13 of feed housing 10. The same, of course, would be true of the head of socket head cap screw 108*j* shown in FIG. 36. Abutment of the head of socket head cap screw 108*j* against the forward end of longitudinal slot 17 determines the forwardmost position of slide body 30 and contact foot 124.

The tool 1 and the screw feed and driver assembly 7 having been described in detail, their method of operation can now be set forth. The operator will first adjust the position of contact foot 108 or 124 in accordance with the length of screw being driven. This is accomplished by locating socket head cap screw 108*j* of FIG. 36 in the desired one of threaded perforations 108*g*, 108*h* and 108*i* in contact foot 108 of FIG. 36 or locating socket head cap screw 108*j* in the proper one of the threaded perforations 124*f*, 124*g*, and 124*h* of contact foot 124 of FIG. 43. Next, a screw bearing strip is caused to pass through the slot (not shown) in trigger guard 6 (see FIG. 1) and is thereafter introduced into the channel formed in slide body 30. Introducing the forward end of tape 8 into slide body 30 is made possible by the fact that the tape can rotate feed sprocket 89 in the direction of arrow A. This is true by virtue of the interaction of cam lugs 95 of the feed sprocket and the cam depressions 103 of the feed pawl together with compression spring 104 (see FIG. 28), as explained above.

Tool 1 is now ready for use and the operator locates contact foot 108 or 124 in an appropriate position on the workpiece where a screw is to be driven. Thereafter, the operator shoves tool 1 toward the workpiece. This will cause the slide body 30 to shift inwardly into feed housing 10. The feed pawl cam roller 100*b* will shift in portion 21*b* of feed housing slot 21, causing the feed pawl and the feed sprocket to rotate in the direction of arrow A one predetermined incremental distance which will cause the forwardmost screw 9 of the strip 8 to advance to the driving position shown in FIGS. 1 and 32. Further advancement of tool 1 against the workpiece will cause the driver 105 to engage the forwardmost screw 9 of strip 8 and drive it into the workpiece. Driving of the screw continues until the clutch within tool 1 precludes further driving. At this point, the operator removes the tool 1 from contact with the workpiece. This allows the slide body 30 to return to its normal forward position under the influence of compression spring 107. Feed pawl cam roller 100*b* returns to its normal position within feed housing slot 21 without turning feed sprocket in a direction opposite direction A. The tool is now ready to drive another screw. After driving one or two screws, the operator may wish to adjust the depth of drive which is accomplished by rotating the knob-like head 121 of bolt 120 to properly position adjustable stop 117 which is abutable by the rearward end of contact foot 108 or 124 to determine the rearwardmost position of slide body 30 and to finely adjust the depth to which the screws are driven.

Prior art screw driving tools are generally provided with a clutch mechanism which enables the driver to be engaged with the head of the screw to be driven and then to be connected to the drive of the tool. Once the screw is driven into the workpiece, the clutch will disengage the driver from the tool drive. Most such clutches comprise a driving member associated with the tool drive, a driven member associated with the screw driver and a compression spring which normally separates the drive member from the driven member. Both the clutch drive member and the clutch driven member have radially extending lugs on their opposed faces. When the tool is pressed forwardly so that the screw to be driven is engaged by the driver, further forward movement of the tool causes the opposed faces of the clutch drive member and the clutch driven member to approach each other against the action of the clutch compression spring. Initial contact of the radial lugs on the clutch drive member and the radial lugs on the clutch driven member creates a partially engaged condition resulting in an unpleasant chattering noise until the opposed faces are fully engaged, with the radial lugs thereof fully interdigitated. This same chatter can occur as the tool is drawn rearwardly from the workpiece and the radial lugs of the clutch driven member and the clutch driving member pass from a fully engaged condition to a partially engaged condition and then to a disengaged condition.

Figure 44:
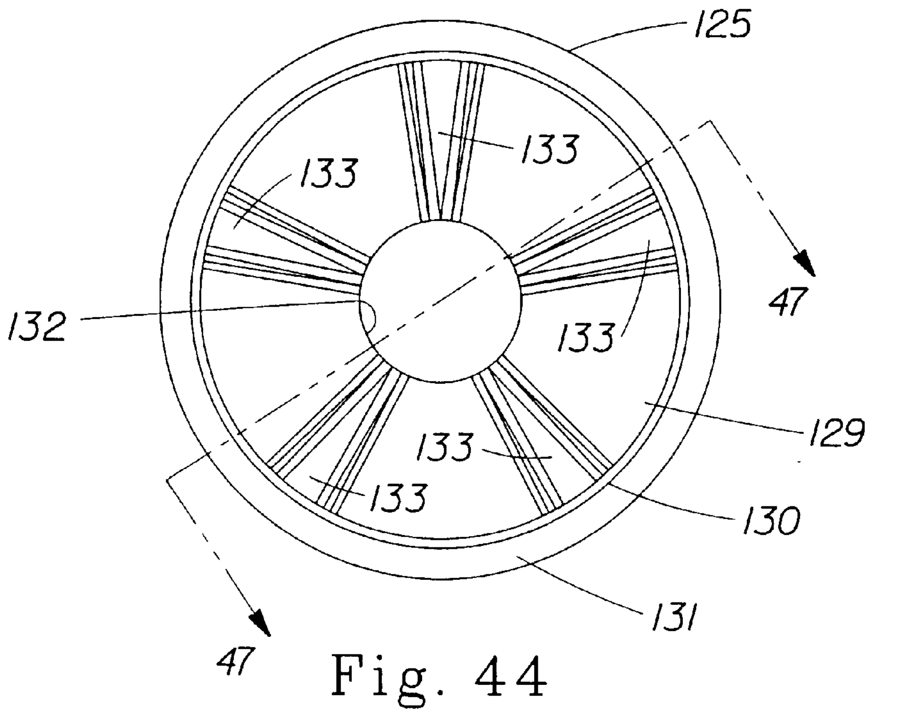
FIG. 44 is a front elevational view of the clutch drive member of the present invention.
Figure 45:
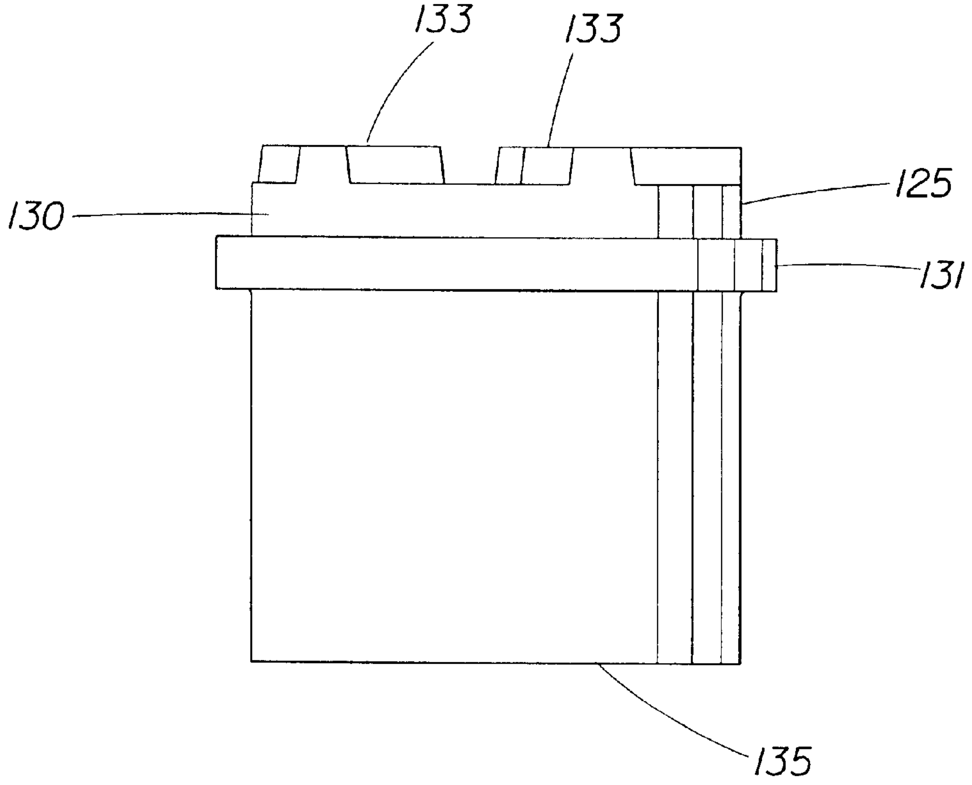
FIG. 45 is a side elevational view of the clutch drive member.
Figure 46:
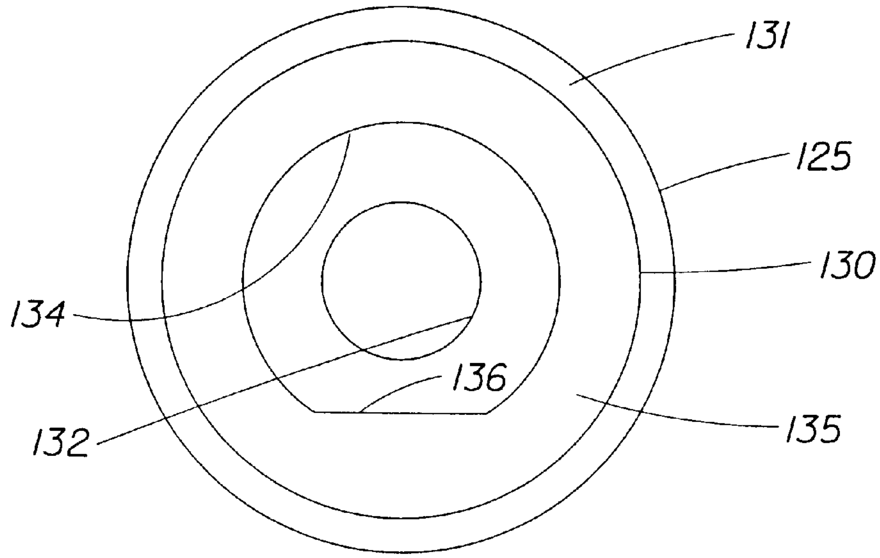
FIG. 46 is a rear elevational view of the clutch drive member.
Figure 47:
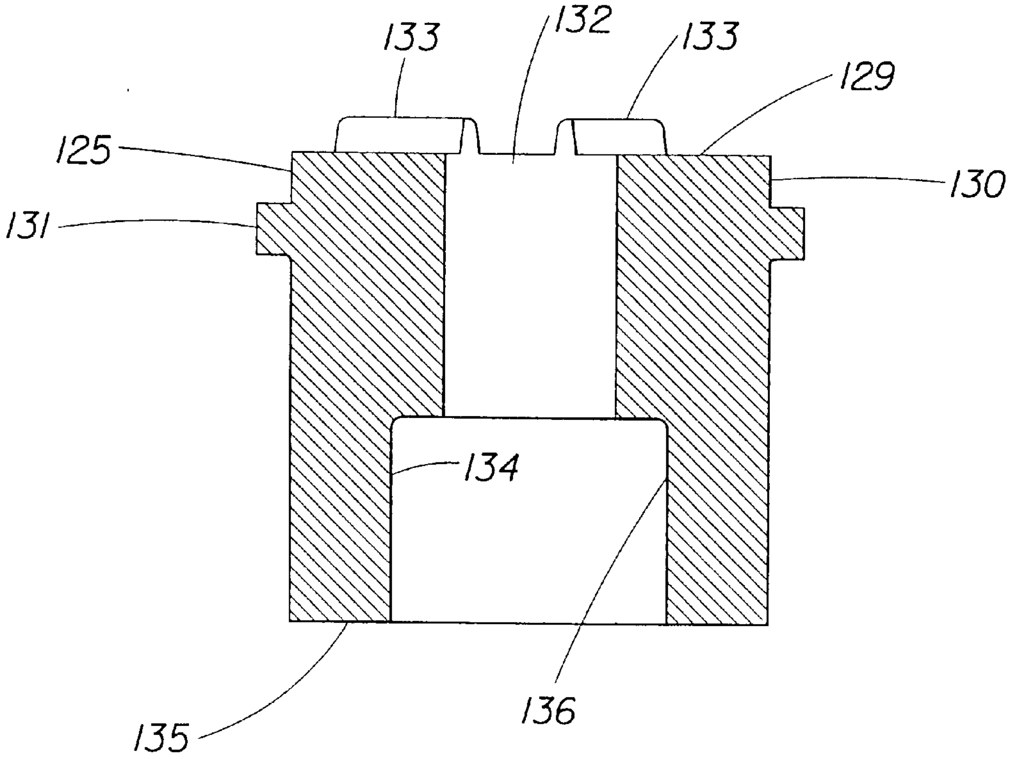
FIG. 47 is a cross-sectional view of the clutch drive member taken along section line 47—47 of FIG. 44.
Figure 57:
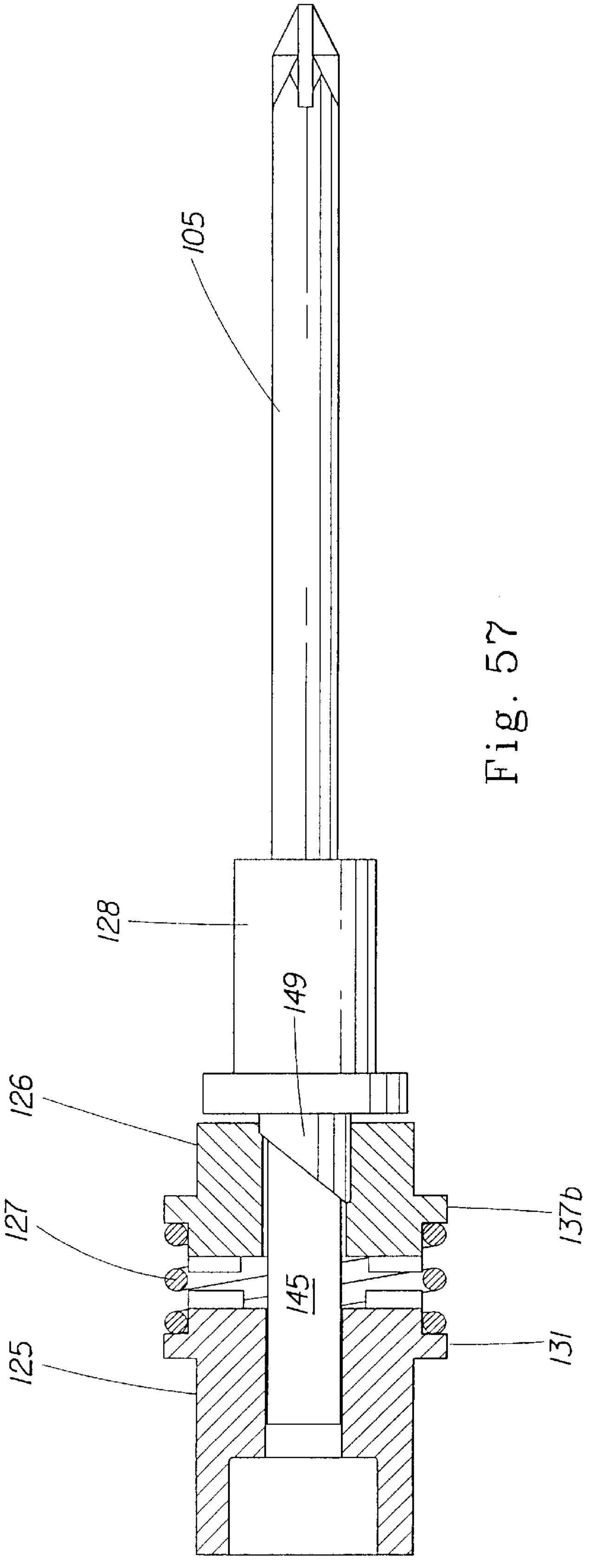
FIG. 57 is a simplified assembly view, partly in cross-section, of the clutch mechanism of the present invention together with the driver.

The tool of the present invention is provided with a clutch mechanism which eliminates the unpleasant chattering noise. Reference is first made to FIG. 57 which illustrates the primary clutch components and screw driver 105. The clutch, itself, comprises a clutch driving member 125, a clutch driven member 126, a clutch spring 127 and a clutch output shaft 128. The clutch driving member 125 is illustrated in FIGS. 44–47. FIG. 44 illustrates the driving face 129 of the clutch driving member 125. The driving face 129 comprises the forward face of a cylindrical body 130. The cylindrical body 130 has an annular peripheral flange 131 formed thereon. The forward driving face 129 has a central bore 132 therethrough and a plurality of evenly spaced radial drive lugs 133 thereon. The bore 132 leads to a larger bore 134 which extends through the rear surface 135 of the clutch driving member 125, as can best be seen in FIGS. 46 and 47.

It will be noted that the inside cylindrical surface of bore 134 is interrupted by a flat surface 136. Bore 134 with flat 136 is adapted to receive the output shaft (not shown) of the planetary drive (not shown) having a corresponding flat thereon.

Figure 48:
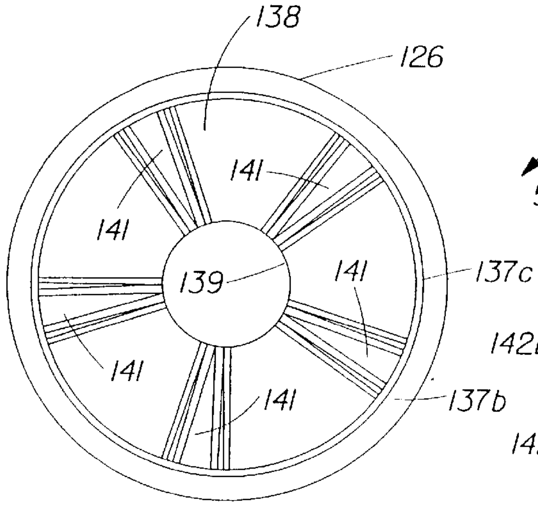
FIG. 48 is a rear elevational view of the driven clutch member of the present invention.
Figure 49:
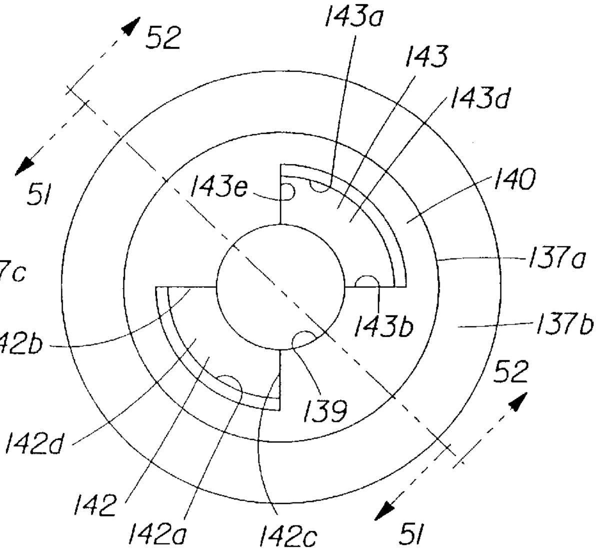
FIG. 49 is a front elevational view of the driven clutch member.
Figure 50:
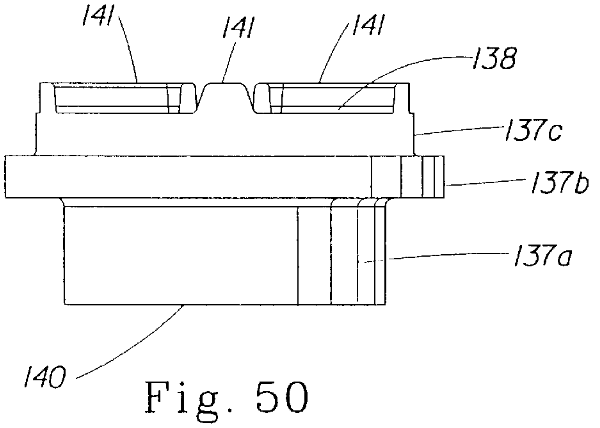
FIG. 50 is a side elevational view of the driven clutch member.
Figure 54:
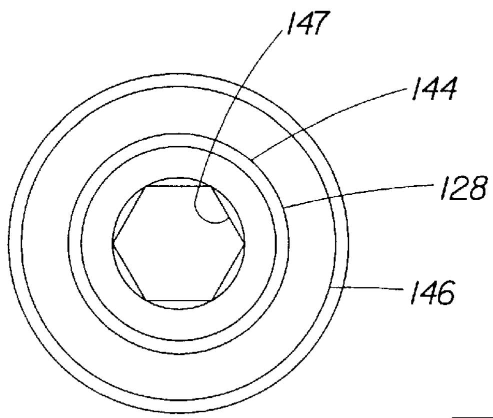
FIG. 54 is an end elevational view as seen from the left of FIG. 53.

Reference is now made to FIGS. 48 through 52, which illustrate the driven clutch member 126. As is best shown in FIG. 50, the clutch driven member 126 comprises a generally cylindrical body having a forward cylindrical portion 137*a* followed by an annular flange portion 137*b* and a rearward body portion 137*c* having a diameter greater than the portion 137*a* and less than the flange 137*b*. FIG. 48 illustrates the rearward surface 138 of driven clutch member 126. The rearward surface has a central bore that passes from the rearward surface 138 through the forward surface 140 of the member 126. The rearward surface 138 is completed by a plurality of evenly spaced radial drive lugs 141.

Figure 51:
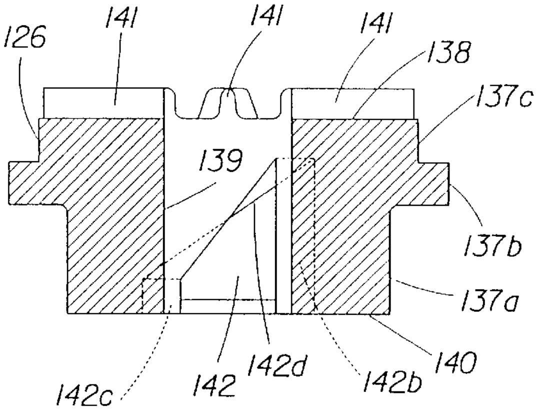
FIG. 51 is a cross-sectional view of the driven clutch member taken along section line 51—51 of FIG. 49.
Figure 52:
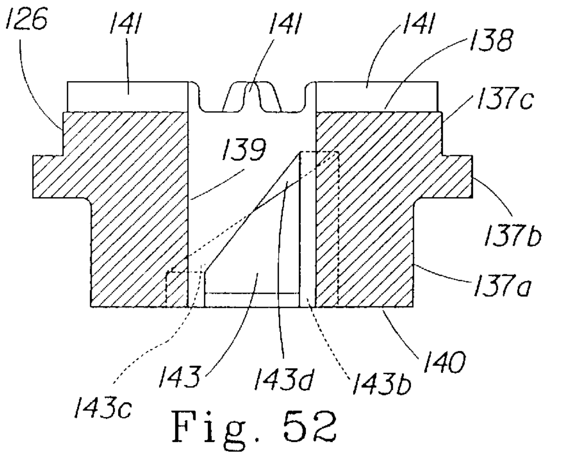
FIG. 52 is a cross-sectional view of the driven clutch member taken along section line 52—52 of FIG. 49.

As is best shown in FIG. 49, illustrating the forward end of the driven clutch member, central bore 139 communicates with a pair of lateral slots 142 and 143 which are diametrically disposed with respect to axial bore 139. Slot 142 is also shown in FIG. 51. As is clearly shown in FIGS. 49 and 51, the slot 142 has an arcuate wall 142*a* opposite its opening into axial bore 139 and having the same center as axial bore 139. Slot 142 has a first end 142*b*, a second end 142*c* and an arcuate upper surface (as viewed in FIG. 51) 142*d*. It will be noted that the walls 142*b* and 142*c* are radial walls (see FIG. 49), and wall 142*b* is taller than wall 142*c* (as viewed in FIG. 51). The arcuate surface 142*d* extends from the top of wall 142*b* to the top of wall 142*c* in an arcuate, sloping fashion (as viewed in FIG. 51).

The slot 143, diametrically opposed to slot 142, is otherwise identical and is illustrated in FIG. 152. The wall and surface portions of slot 143, indicated at 143*a* through 143*d*, are identical to the walls and surfaces 142*a* through 142*d* of slot 142. The purposes of slots 142 and 143 will be apparent hereinafter.

The shaft 128 of the clutch assembly is shown in FIGS. 53 through 56. Shaft 128 has a forward portion 144 and a rearward portion 145, the portions 144 and 145 being separated by an annular flange 146. The portion 144 is of slightly larger diameter than the portion 145 and contains an axial socket 147. The socket 147 is also clearly shown in FIGS. 54 and 56. The socket 147 is adapted to receive, in a non-rotative fashion, the hexagonal rearward end 106 of driver 105. Socket 147 has an annular groove thereabout, shown in FIGS. 53 and 56 at 148. The purpose of groove 148 is to receive a resilient keeper, such as a split metal ring, a resilient O-ring or the like, which releasably maintains the rearward end 106 of driver 105 within the socket 147. The rearward portion 145 of clutch shaft 128 is of lesser diameter than the cylindrical portion 144 and is adapted to be slidably received in the central bore 139 of driven clutch member 126 and the axial bore 132 of clutch driving member 125. Shaft portion 145 is provided with a pair of lugs 149 and 150. Lugs 149 and 150 are identical, are diametrically located with respect to shaft portion 145, and constitute an integral, one-piece part of clutch output shaft 128.

Figure 56:
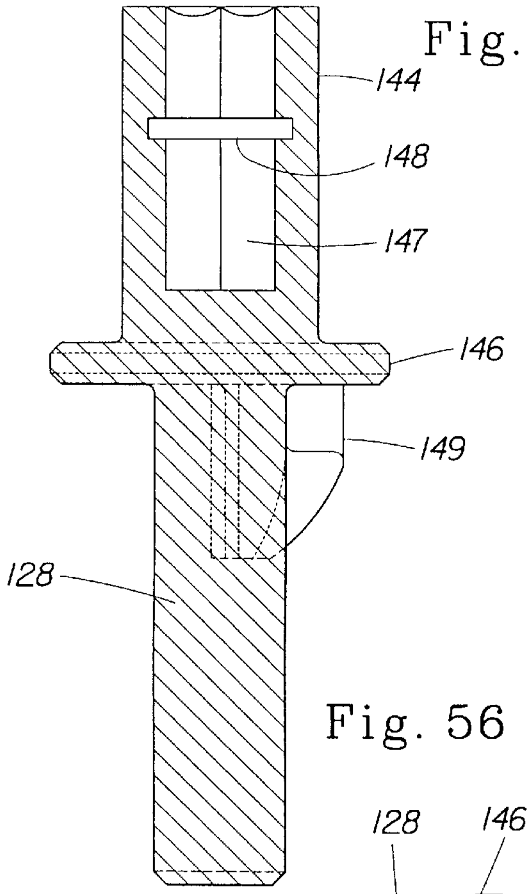
FIG. 56 is a cross-sectional view taken along section line 56—56 of FIG. 54.
Figure 53:
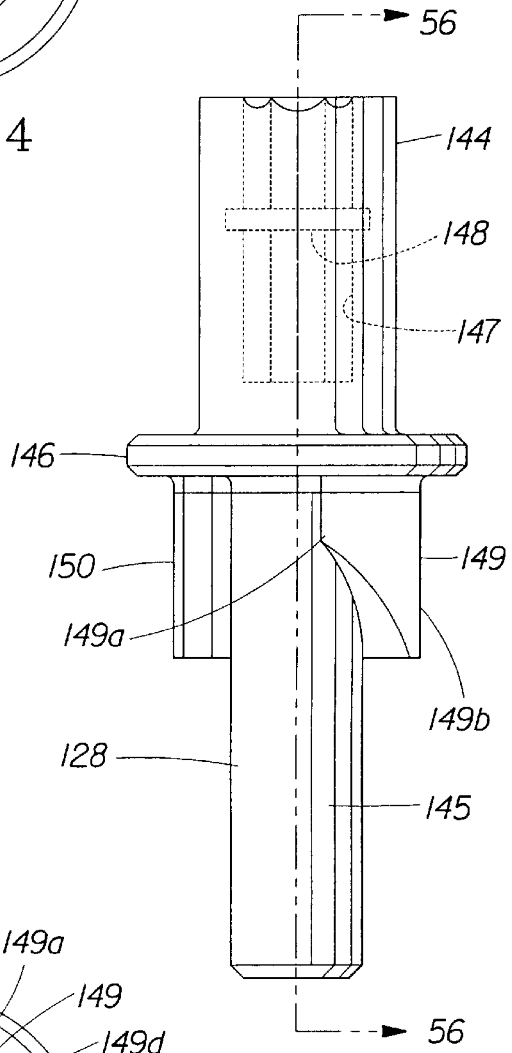
FIG. 53 is an elevational view of the clutch output shaft of the present invention.
Figure 55:
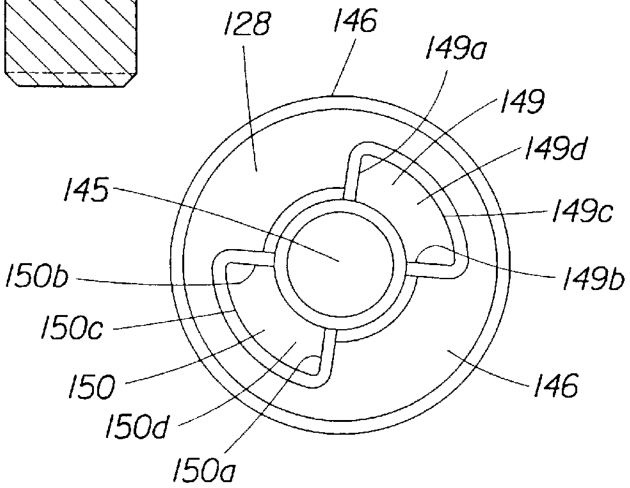
FIG. 55 is an end elevational view as seen from the right of FIG. 53.

Lug 149, as shown in FIGS. 53, 55 and 56, has a radial forward wall 149*a*, a radial rearward wall 149*b*, an exterior arcuate wall 149*c* and a surface 149*d* which slopes from rear wall 149*b* to forward wall 149*a*. In fact, the configuration of lug 149 is substantially identical to the configuration of slot 142 (see FIG. 51), with the exception that the radial distance between lug walls 149*a* and 149*b* is less than the radial distance between slot walls 142*c* and 142*b*. The sloping surface 142*d* of slot 142 corresponds to the sloping surface 149*d* of lug 149, and when lug 149 is located within slot 142 (as will be described hereinafter), these surfaces are parallel and abutting.

As indicated above, lug 150 is identical to lug 149. To this end, lug 150 has a forward wall 150*a*, a rearward wall 150*b*, an arcuate exterior wall 150*c*, and a sloping surface 150*d*. The lug 150 is receivable with slot 143 of FIG. 52 and bears the same relationship with slot 143 as does lug 149 with slot 142.

Reference is again made to FIG. 57 which shows the assembly of the driver and the clutch mechanism. The rearward end of driver 105 is located within the clutch output socket 147 and is releasably maintained therein by a keeper (not shown), located in the annular socket groove 148 (see FIG. 56). The driven clutch member 126 is mounted on the clutch output shaft portion 145 with its surface 138 bearing radial lugs 141 facing rearwardly. The driving clutch member 125 is also mounted on clutch output shaft portion 145 with its surface 129 bearing lugs 133 facing driven clutch member 126. The opposed lug-bearing faces 129 of driving member 125 and 138 of driven member 126 are normally separated by compression spring 127. One end of compression spring 127 seats against the annular flange 131 of driving member 125, while the other end of spring 127 seats against annular flange 137*b* of driven member 126. It will be understood that the output shaft (not shown) of the planetary drive or other gear assembly will be non-rotatively received in bore 135 of driven clutch member 125. Finally, as indicated above, lugs 149 and 150 of clutch output shaft 128 are received in slots 142 and 143, respectively, of driven member 126. It will be understood that since the slots 142 and 143 are identical and the lugs 149 and 150 are identical, either lug can be received in either slot.

The driven clutch member 125 is caused to rotate by the motor and associated gearing of tool 1, when the tool trigger 4 is actuated. Since the driving member 125 of the clutch is normally separated from the driven member 126, only the driving member is caused to rotate by the motor and gearing. When the contact foot 108 or 124 is pressed against the workpiece to advance tape 8 and locate the forwardmost screw of the tape in driving position, further advancement of the tool toward the workpiece will cause engagement of the forwardmost screw by driver 105. Once the screw has been engaged by the driver, further forward motion of tool 1 will cause the driving clutch member 125 to approach the driven member 126 against the action of compression spring 127.

In the usual prior art clutch, the driven member 126 and the output shaft 128 would either constitute an integral, one-piece structure or the output shaft 128 would be directly keyed to driven member 126. When the lugs 133 of the driving member 125 begin to contact the lugs 141 of driven member 126, a chattering noise would occur since the driven member 126 (being keyed or constituting an integral part of output shaft 128) would initially resist turning. This is caused by engagement of the driver 105 with the head of the screw. When the driving member lugs 133 interdigitate with the driven member lugs 141, direct rotation is imparted from the driving member 125 to driven member 126, output shaft 128 and screw driver 105, at which point the chatter will stop. For substantially the same reasons, a momentary chatter will occur as the tool is pulled away from the driven screw.

The presence of the slots 142 and 143 and the lugs 149 and 150 eliminates this chatter in the following manner. At the instant when the lugs 133 of driving member 125 contact the lugs 141 of driven member 126, a torque is applied to the driven member 126. The interaction of sloped surfaces 142*d* and 143*d* of slots 142 and 143, respectively, with the correspondingly sloped surfaces 149*d* and 150*d*, respectively, shifts the driven member 126 rearwardly, causing the clutch faces to be brought into positive engagement instantly, eliminating a partial engagement condition and the resultant chatter. Similarly, as the screw reaches the desired depth of drive, regardless of the amount of torque required, the faces and lugs of driving member 125 and driven member 126 reach a condition where they are in close proximity, but the driving member 125 cannot supply constant torque output to the driven member 126. At this point, the driven member 126 is urged forwardly by the interaction of the sloped surfaces of the slots 142 and 143 and the lugs 149 and 150, substantially instantly separating driving member lugs 133 from the driven member lugs 141. This again eliminates the partially engaged condition and its related chatter.

Figure 59:
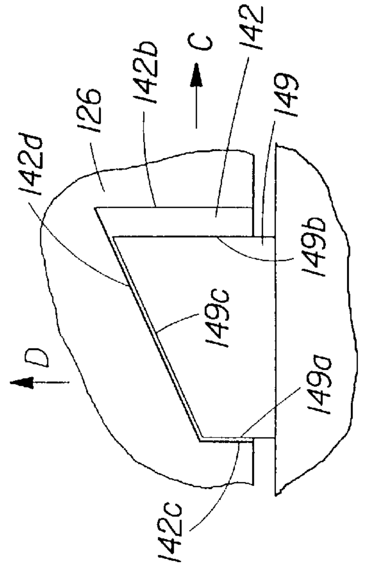
FIG. 59 is a fragmentary view of the clutch mechanism of FIG. 58 in its shifted position.
Figure 58:
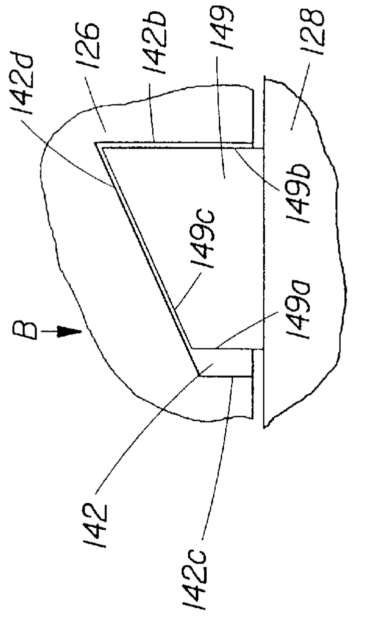
FIG. 58 is a fragmentary view of the clutch mechanism of the present invention showing the lug of the output shaft in its normal position.

The interaction of lug 149 and slot 142 is illustrated in FIGS. 58 and 59. It will be understood that the interaction of lug 150 in slot 143 is identical. FIGS. 58 and 59 are semi-diagrammatic, since, for purposes of clarity, the radial curve of slot 142 and lug 149 have been removed.

FIG. 58 illustrates the normal position of lug 149 within slot 142 caused by the urging of compression spring 127 (see FIG. 57) in the direction of arrow B. Initial contact of the driving member lugs 133 with the driven member lugs 141 will instantly result in a torque applied to driven member 126 causing it to rotate in the direction of arrow C (see FIG. 59). Output shaft 128 and its lug 149 initially resist rotation by virtue of the engagement of driver 105 in the head of the screw to be driven. When driven member 126 shifts in the direction of arrow C, it will also shift in the direction of arrow D by virtue of the interaction of sloped slot surface 142*d* with the sloped lug surface 149*c*. Motion in the direction of arrow D is motion toward driving member 125 causing the lugs of driving member 125 and driven member 126 to interengage substantially instantly without a chatter producing partial engagement condition. When the screw is driven to the desired depth and resists further driving, the cross-sectional configurations of driving member lugs 133 and driven member lugs 141 are such that they begin to separate. This tends to shift the driven member 126 away from the driving member 125. As a result of this, the driven member 126 can shift toward lug 149, and, through the interaction of surfaces 142*d* and 149*c*, assumes the position with respect to lug 149 illustrated in FIG. 58. This results in substantially instant disengagement of the driving member lugs 133 and the driven member lugs 141 eliminating a partial engagement, chatter producing condition.

As indicated above, prior art workers have devised a number of different electric screw driving tools connected to household current or battery power. These tools are characterized by an operating trigger or the like, an electric motor, appropriate bearings and an appropriate gear arrangement to determine speed of rotation and torque. They are usually provided with a clutch. It will be understood by one skilled in the art that the screw feed and driver assembly 7, illustrated in FIGS. 1, 26, 27, 36 and 43 could be provided as an accessory, together with an adapter by which the screw feed and driver assembly 7 can be attached to the prior art screw driver. Means may also be provided to contain and guide the screw bearing strip 8. For example, the screw feed and driver assembly attachment could be affixed to the prior art electric screw driver upside down as compared to FIG. 1 so that the screw bearing strip would enter the slide body 30 from above. An appropriate channel member could be mounted along the top of the screw feed and driver assembly and the prior art screw driver tool to contain and guide the screw-bearing strip. In such an instance, the screw driver would be movably affixed to the output of the pre-existing clutch of the prior art tool.

It would also be within the scope of the present invention to elongate feed housing 10 so that it would contain the clutch assembly of the present invention. In such an instance, the driving clutch member would be appropriately connected to the output of the conventional prior art drill, driven by electrical current or battery means. It is therefore contemplated that the teachings of the present invention may be presented in the form of a complete screw driving tool as illustrated in FIG. 1, in the form of a screw feed and driver assembly presented as an accessory for a typical prior art electrical screw driver to render the prior art screw driver self-feeding, or as an accessory comprising the screw feed and driver assembly, together with the clutch of the present invention, to convert an ordinary manual electrical drill to a self-feeding electrical screw driver.

Modifications may be made in the invention without departing from the spirit of it.

What is claimed:

1. A screw feed and driver assembly which constitutes a part of a screw driving tool of the type having a prime mover, a speed and torque determining gear assembly and a clutch, which constitutes an accessory for a clutch containing manual feed powered screw driver, and which, combined with a clutch, comprises an accessory for a standard power drill, said screw feed and driver assembly comprising an elongated hollow feed housing, a slide body mounted in said feed housing and being slidable therein between forward and rearward positions, said slide body biased to said forward position, said slide body having a transverse channel to receive and guide a screw bearing strip having notches on at least one of its longitudinal edges, a workpiece contact foot mounted on said slide body and being configured to shift said slide body rearwardly when pressed against a workpiece, a clutch mounted screw driver extending longitudinally into said slide body, and a feed sprocket and feed pawl assembly actuable by rearward movement of said slide body to incrementally advance said strip, aligning a screw with said driver to be driven thereby upon further rearward movement of said slide body, with said feed sprocket and feed pawl assembly comprising a feed sprocket having a plurality of teeth evenly spaced about the peripheral edge of said feed sprocket, with each adjacent pair of teeth being separated by an arcuate edge portion and a notched edge portion.

2. The screw feed and driver assembly claimed in claim 1 wherein said channel in said slide body is substantially arcuate in configuration to help align a screw with said driver when said screw is positioned for driving.

3. The screw feed and driver assembly claimed in claim 1 including a guideway for said screw bearing strip leading to said slide body channel.

4. The screw feed and driver assembly claimed in claim 1, including an adjustable rear stop for said contact foot and said slide body attached thereto whereby to adjust the depth to which a screw is driven into a workpiece.

5. The screw feed and driver assembly claimed in claim 4 wherein said adjustable stop comprises a stop block having a threaded bore, said feed housing having top and bottom walls and first and second side walls, a bolt with a knob at one end extending through a clearance hole in said bottom wall, through a compression spring, through said threaded bore in said stop block and through a clearance hole in top wall of said feed housing, said stop block having a surface sloping transversely of said feed housing, said contact foot having a corresponding sloped rear surface, abutment of said sloping surfaces and the transverse position of said stop block determining the rearwardmost position of said contact foot and said slide body and thus the depth of drive.

6. The screw feed and driver assembly claimed in claim 1 wherein said contact foot is affixable to said slide body in at least two longitudinal positions thereon whereby to accommodate at least two sizes of screws.

7. The screw feed and driver assembly claimed in claim 6 wherein said slide body is provided with a threaded hole, said contact foot being provided with at least two clearance holes at different longitudinal positions thereon, said contact foot being affixable to said slide body by means of a socket head cap screw passing through one of said contact foot clearance holes and threadedly engaged in said slide body threaded hole.

8. The screw feed and driver assembly claimed in claim 7 wherein said contact foot comprises an "L"-shaped member having a short portion and a long portion joined at a right angle, said short portion being contactable with a workpiece and said long portion being affixed to said slide body.

9. The feed and driver assembly claimed in claim 7 wherein said contact foot comprises an "L"-shaped member having a short portion and a long portion joined at a right angle, said short portion being made of wire and being contactable with a workpiece, said long portion being made of sheet metal and being affixed to said slide body.

10. The screw feed and driver assembly claimed in claim 7 including a longitudinal slot formed in one of the side walls of said feed housing said socket head cap screw extending into said slot, said slot having a forward end, said forward position of said slide body being determined by abutment of said forward slot end by said socket head cap screw.

11. The screw feed and driver assembly claimed in claim 1 wherein said slide body comprises first and second matable halves.

12. The screw feed and driver assembly claimed in claim 1 including a compression spring biasing said slide body to said forward position.

13. The screw feed and driver assembly claimed in claim 1 wherein said feed sprocket wheel has teeth engaging the notches of only one longitudinal edge of said screw bearing strip, said feed sprocket providing clearance so said driver is substantially coaxial with a screw positioned to be driven.

14. The screw feed and driver assembly claimed in claim 1 further comprising a first side of said feed sprocket having a central hub, a second side of said feed sprocket having a central shaft, said second side also having four identical cam lugs thereon, said feed pawl comprising a circular member having a central bore sized to slidingly receive said feed sprocket shaft, when mounted on said shaft, said side of said feed pawl facing said side of said feed sprocket with said cam lugs having a plurality of evenly spaced, identical cam depressions, said cam lugs and said cam depressions being so configured as to cause said feed sprocket and feed pawl to turn together in a direction advancing said strip through said slide body, and allowing said pawl to rotate in the opposite direction out of engagement with said feed sprocket.

15. The screw feed and driver assembly claimed in claim 14 wherein said first slide body half has an inner surface with a central bore to receive said feed sprocket and feed pawl assembly, an annular peripheral portion of said feed sprocket resting on said inner surface, said bore having a first diameter portion adjacent said inner surface dimensioned to rotatively receive said feed pawl and to permit axial movement thereof toward and away from said feed sprocket, said second bore portion extending from said first bore portion and terminating in an annular shoulder adjacent said third bore portion, said second bore portion and said annular shoulder accommodating and supporting a compression spring biasing said fed pawl in contact with said feed sprocket, said third bore portion being so sized as to rotatively accommodate said feed sprocket shaft.

16. The screw feed and driver assembly claimed in claim 15 wherein said feed pawl has a lateral extension, said extension carrying a cylindrical post extending perpendicularly from said extension in a direction away from said face thereof having said cam depressions, a cam roller being rotatively mounted on said feed pawl extension and rotatable about an axis perpendicular thereto, said cam roller extending through an arcuate slot in said first slide body half and a substantially "L"-shaped slot in one side of said feed housing whereby rearward movement of said slide body will result in movement of said feed pawl from a normal position shifting said feed sprocket by an increment sufficient to locate a nail in driving position and whereby forward movement of said slide body will return said feed pawl to said normal position.

17. The screw feed and driver assembly claimed in claim 16 including a leaf spring having one end fixed in said first slide body half, said leaf spring having a second end engaging the peripheral edge of said feed sprocket, said second leaf spring end rides over the feed sprocket teeth as said feed sprocket rotates through said increment, whereupon said free end of said leaf spring is caused by said feed pawl cylindrical post to enter one of said peripheral notches of said feed sprocket peripheral edge to prevent movement of said feed sprocket with said feed pawl as said feed pawl returns to its normal position.

18. The screw feed and driver assembly claimed in claim 17 wherein said channel in said slide body is substantially arcuate in configuration to help align a screw with said driver when said screw is positioned for driving.

19. The screw feed and driver assembly claimed in claim 18 including a guideway for said screw bearing strip leading to said slide body channel.

20. The screw feed and driver assembly claimed in claim 19, including an adjustable rear stop for said contact foot and said slide body attached thereto whereby to adjust the depth to which a screw is driven into a workpiece.

21. The screw feed and driver assembly claimed in claim 20 wherein said contact foot is affixable to said slide body in at least two longitudinal positions to accommodate at least two sizes of screws.

22. The screw feed and driver assembly claimed in claim 21 including a compression spring biasing said slide body to said forward position.

23. The screw feed and driver assembly claimed in claim 22 wherein said feed sprocket wheel has teeth engaging the notches of only one longitudinal edge of said screw bearing strip, said feed sprocket providing clearance so said driver is substantially coaxial with a screw positioned to be driven.

24. The screw feed and driver assembly claimed in claim 23 wherein said slide body is provided with a threaded hole, said contact foot being provided with at least two clearance holes, said contact foot being adjustably affixable to said slide body by means of a socket head cap screw passing through one of said contact foot clearance holes and threadedly engaged in said slide body threaded hole.

25. The screw feed and driver assembly claimed in claim 24 wherein said contact foot comprises an "L"-shaped member having a short portion and a long portion joined at a right angle, said short portion being contactable with a workpiece and said long portion being affixed to said slide body.

26. The feed and driver assembly claimed in claim 24 wherein said contact foot comprises an "L"-shaped member having a short portion and a long portion joined at a right angle, said short portion being made of wire and being contactable with a workpiece, said long portion being made of sheet metal and being affixed to said slide body.

27. The screw feed and driver assembly claimed in claim 24 including a longitudinal slot formed in one of the side walls of said feed housing said socket head cap screw extending into said slot, said slot having a forward end, said forward position of said slide body being determined by abutment of said forward slot end by said socket head cap screw.

28. The screw feed and driver assembly claimed in claim 1 including a screw driving tool, said screw feed and driver assembly comprising part of said tool, said tool being of the type having a prime mover, a speed and torque determining gear assembly and a clutch, said clutch having an output connected to said driver, said prime mover being an electric motor connected to one of a source of ordinary current and batteries.

29. The screw feed and driver assembly claimed in claim 28 wherein said clutch comprises a clutch driving member, a clutch driven member, a clutch spring and a clutch output shaft, said driving member comprising a cylindrical member terminating in forward and rearward ends, said forward end comprising a driving face, a plurality of radial drive lugs on said driving face, said driving member having a central bore extending from said driving face to a larger coaxial socket extending through said rearward end and configured to non-rotatively receive the output shaft of a drive means, said cylindrical driving member having an annular exterior flange near said driving face, said driven clutch member comprising a cylindrical body having forward and rearward ends, an axial bore passing through said driven member, said rearward end of said driven member having a plurality of evenly spaced radial drive lugs, an annular exterior flange surrounding said driven member, a pair of diametrically opposed slots formed in said axial bore and open at said forward end of said driven member, said clutch output shaft comprising a forward portion and a rearward portion with an annular flange therebetween, said forward portion having a socket formed therein to receive a member to be driven by said clutch, said rearward portion of said output shaft being of a diameter to be received in said driven member axial bore and in said driving member axial bore, a pair of diametrically opposed lugs formed on said rearward shaft portion and receivable in said driven member slots, said driving member being mounted on said rearward portion adjacent said output shaft annular flange with said output lugs received in said driven member slots, said clutch spring comprising a compression spring located between said driving and driven members, said spring having ends seated on said driving member exterior flange and said driven member exterior flange, said clutch spring urging said drive member drive lugs away from said driven member drive lugs, said slots and said lugs being so configured that when said driving member is rotated and caused to be approached by said driven member against the action of said clutch spring, said slots and lugs interact to shift the driving lugs of said driven member into instant positive driving engagement with no chatter and at the end of the driving operation the slots and lugs will cooperate to shift the driven member driving lugs instantly out of engagement with the driving member driving lugs without chatter.

30. The clutch claimed in claim 29 wherein each of said identical slots in said driven member forms an opening into said central bore of said driven member, each slot having an arcuate interior wall opposite said opening, said arcuate wall having the same axis as said central bore, each slot having first and second radial side walls, said first side wall being longer than said second side wall, each slot having an arcuate end surface sloping downwardly from the adjacent end of said first side wall to the adjacent end of said second side wall, each of said slots forming an opening in said forward end of said driven member, said lugs of said output shaft extending longitudinally along said rearward shaft portion from said shaft annular flange, said identical lugs having arcuate exterior surfaces corresponding to said arcuate interior surfaces of said slots, said lugs having first and second radial side walls corresponding to said first and second radial side walls of said slots, said first side wall of each lug being longer than said second side wall thereof, each lug having an arcuate sloping end surface extending from the adjacent end of said first side wall to the adjacent end of said second side wall and corresponding to said arcuate end walls of said slots, said lugs each being narrower from side wall to side wall than said slots, said lugs being receivable in said slots and being shiftable between said side walls of said slots, said arcuate end walls of said slots and lugs cooperating to cause said driven member to shift away from said drive shaft annular flange and to cause said radial drive lugs of said driven member to quickly nest with said radial drive lugs of said driving member when said output shaft lug first long walls approach said slot first long walls, and said arcuate end walls of said slots and lugs cooperating to cause said driven member to shift toward said drive shaft annular flange and to cause said radial drive lugs of said driven member to quickly disengage from said radial drive lugs of said driving member when said second end walls of said lugs approach said second walls of said slots.

31. The screw feed and driver assembly claimed in claim 1 including a clutch-containing, manual feed, powered screw driver, said screw feed and driver assembly constituting an accessory for said screw driver, an adapter for mounting said screw feed and driver assembly to said screw driver, said powered screw driver being connectable to one of a source of ordinary current and batteries.

32. The screw feed and driver assembly claimed in claim 1 wherein said screw feed and driver assembly feed housing is elongated to contain a clutch to which said driver is operatively attached, a standard power drill, said clutch containing screw feed and driver assembly comprising an accessory for said standard power drill.

33. The screw feed and driver assembly claimed in claim 32 wherein said clutch comprises a clutch driving member, a clutch driven member, a clutch spring and a clutch output shaft, said driving member comprising a cylindrical member terminating in forward and rearward ends, said forward end comprising a driving face, a plurality of radial drive lugs on said driving face, said driving member having a central bore extending from said driving face to a larger coaxial socket extending through said rearward end and configured to non-rotatively receive the output shaft of a drive means, said cylindrical driving member having an annular exterior flange near said driving face, said driven clutch member comprising a cylindrical body having forward and rearward ends, an axial bore passing through said driven member, said rearward end of said driven member having a plurality of evenly spaced radial drive lugs, an annular exterior flange surrounding said driven member, a pair of diametrically opposed slots formed in said axial bore and open at said forward end of said driven member, said clutch output shaft comprising a forward portion and a rearward portion with an annular flange therebetween, said forward portion having a socket formed therein to receive a member to be driven by said clutch, said rearward portion of said output shaft being of a diameter to be received in said driven member axial bore and in said driving member axial bore, a pair of diametrically opposed lugs formed on said rearward shaft portion and receivable in said driven member slots, said driving member being mounted on said rearward portion adjacent said output shaft annular flange with said output lugs received in said driven member slots, said clutch spring comprising a compression spring located between said driving and driven members, said spring having ends seated on said driving member exterior flange and said driven member exterior flange, said clutch spring urging said drive member drive lugs away from said driven member drive lugs, said slots and said lugs being so configured that when said driving member is rotated and caused to be approached by said driven member against the action of said clutch spring, said slots and lugs interact to shift the driving lugs of said driven member into instant positive driving engagement with no chatter and at the end of the driving operation the slots and lugs will cooperate to shift the driven member driving lugs instantly out of engagement with the driving member driving lugs without chatter.

34. The clutch claimed in claim 33 wherein each of said identical slots in said driven member forms an opening into said central bore of said driven member, each slot having an arcuate interior wall opposite said opening, said arcuate wall having the same axis as said central bore, each slot having first and second radial side walls, said first side wall being longer than said second side wall, each slot having an arcuate end surface sloping downwardly from the adjacent end of said first side wall to the adjacent end of said second side wall, each of said slots forming an opening in said forward end of said driven member, said lugs of said output shaft extending longitudinally along said rearward shaft portion from said shaft annular flange, said identical lugs having arcuate exterior surfaces corresponding to said arcuate interior surfaces of said slots, said lugs having first and second radial side walls corresponding to said first and second radial side walls of said slots, said first side wall of each lug being longer than said second side wall thereof, each lug having an arcuate sloping end surface extending from the adjacent end of said first side wall to the adjacent end of said second side wall and corresponding to said arcuate end walls of said slots, said lugs each being narrower from side wall to side wall than said slots, said lugs being receivable in said slots and being shiftable between said side walls of said slots, said arcuate end walls of said slots and lugs cooperating to cause said driven member to shift away from said drive shaft annular flange and to cause said radial drive lugs of said driven member to quickly nest with said radial drive lugs of said driving member when said output shaft lug first long walls approach said slot first long walls, and said arcuate end walls of said slots and lugs cooperating to cause said driven member to shift toward said drive shaft annular flange and to cause said radial drive lugs of said driven member to quickly disengage from said radial drive lugs of said driving member when said second end walls of said lugs approach said second walls of said slots.

35. A clutch comprising a clutch driving member, a clutch driven member, a clutch spring and a clutch output shaft, said driving member comprising a cylindrical member terminating in forward and rearward ends, said forward end comprising a driving face, a plurality of radial drive lugs on said driving face, said driving member having a central bore extending from said driving face to a larger coaxial socket extending through said rearward end and configured to non-rotatively receive the output shaft of a drive means, said cylindrical driving member having an annular exterior flange near said driving face, said driven clutch member comprising a cylindrical body having forward and rearward ends, an axial bore passing through said driven member, said rearward end of said driven member having a plurality of evenly spaced radial drive lugs, an annular exterior flange surrounding said driven member, a pair of diametrically opposed slots formed in said axial bore and open at said forward end of said driven member, said clutch output shaft comprising a forward portion and a rearward portion with an annular flange therebetween, said forward portion having a socket formed therein to receive a member to be driven by said clutch, said rearward portion of said output shaft being of a diameter to be received in said driven member axial bore and in said driving member axial bore, a pair of diametrically opposed lugs formed on said rearward shaft portion and receivable in said driven member slots, said driving member being mounted on said rearward portion adjacent said output shaft annular flange with said output lugs received in said driven member slots, said clutch spring comprising a compression spring located between said driving and driven members, said spring having ends seated on said driving member exterior flange and said driven member exterior flange, said clutch spring urging said drive member drive lugs away from said driven member drive lugs, said slots and said lugs being so configured that when said driving member is rotated and caused to be approached by said driven member against the action of said clutch spring, said slots and lugs interact to shift the driving lugs of said driven member into instant positive driving engagement with no chatter and at the end of the driving operation the slots and lugs will cooperate to shift the driven member driving lugs instantly out of engagement with the driving member driving lugs without chatter.

36. The clutch claimed in claim 35 wherein each of said identical slots in said driven member forms an opening into said central bore of said driven member, each slot having an arcuate interior wall opposite said opening, said arcuate wall having the same axis as said central bore, each slot having first and second radial side walls, said first side wall being longer than said second side wall, each slot having an arcuate end surface sloping downwardly from the adjacent end of said first side wall to the adjacent end of said second side wall, each of said slots forming an opening in said forward end of said driven member, said lugs of said output shaft extending longitudinally along said rearward shaft portion from said shaft annular flange, said identical lugs having arcuate exterior surfaces corresponding to said arcuate interior surfaces of said slots, said lugs having first and second radial side walls corresponding to said first and second radial side walls of said slots, said first side wall of each lug being longer than said second side wall thereof, each lug having an arcuate sloping end surface extending from the adjacent end of said first side wall to the adjacent end of said second side wall and corresponding to said arcuate end walls of said slots, said lugs each being narrower from side wall to side wall than said slots, said lugs being receivable in said slots and being shiftable between said side walls of said slots, said arcuate end walls of said slots and lugs cooperating to cause said driven member to shift away from said drive shaft annular flange and to cause said radial drive lugs of said driven member to quickly nest with said radial drive lugs of said driving member when said output shaft lug first long walls approach said slot first long walls, and said arcuate end walls of said slots and lugs cooperating to cause said driven member to shift toward said drive shaft annular flange and to cause said radial drive lugs of said driven member to quickly disengage from said radial drive lugs of said driving member when said second end walls of said lugs approach said second walls of said slots.

* * * * *